US008717618B2

(12) United States Patent
Iguchi et al.

(10) Patent No.: US 8,717,618 B2
(45) Date of Patent: May 6, 2014

(54) DECOLORING DEVICE, METHOD OF DETERMINING DECOLORING SUCCESS OR FAILURE AND COMPUTER-READABLE RECORDING MEDIUM RECORDING DECOLORING SUCCESS OR FAILURE DETERMINING PROGRAM

(75) Inventors: Ken Iguchi, Shizuoka-ken (JP); Isao Yahata, Shizuoka-ken (JP); Takahiro Kawaguchi, Shizuoka-ken (JP); Hiroyuki Taguchi, Shizuoka-ken (JP); Hiroyuki Tsuchihashi, Shizuoka-ken (JP); Hiroyuki Taki, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 399 days.

(21) Appl. No.: 13/042,331

(22) Filed: Mar. 7, 2011

(65) Prior Publication Data

US 2011/0222130 A1 Sep. 15, 2011

Related U.S. Application Data

(60) Provisional application No. 61/312,080, filed on Mar. 9, 2010, provisional application No. 61/318,229, filed on Mar. 26, 2010, provisional application No. 61/312,077, filed on Mar. 9, 2010.

(51) Int. Cl.
*H04N 1/60* (2006.01)

(52) U.S. Cl.
USPC ........... 358/1.9; 358/2.1; 358/3.24; 358/3.26; 358/1.18; 358/518

(58) Field of Classification Search
USPC ......................... 358/1.9, 3.26–3.27, 518–525
See application file for complete search history.

(56) References Cited

U.S. PATENT DOCUMENTS 5,405,726 A * 4/1995 Abe et al. ......................... 430/97
5,572,311 A * 11/1996 Abe et al. ...................... 399/127

(Continued)

FOREIGN PATENT DOCUMENTS

JP 05-119672 5/1993
JP 06-17963 U 3/1994

(Continued)

OTHER PUBLICATIONS

English translation of Office Action for JP Application No. 2011-051403, dated Feb. 12, 2014.
English translation of Office Action for JP Application No. 2011-051407, dated Feb. 12, 2014.

*Primary Examiner* — Richard Zhu
(74) *Attorney, Agent, or Firm* — Patterson & Sheridan, LLP

(57) ABSTRACT

There is provided a decoloring device including a decoloring unit, a first sheet conveying unit, a pre-decoloring reading unit, a type determining unit, a second sheet conveying unit, a post-decoloring reading unit, a decoloring success or failure determining unit, and a determination criterion setting unit. The type determining unit determines the type of image on the sheet conveyed to the decoloring unit based on the reading result in the pre-decoloring reading unit. The post-decoloring reading unit reads an image on the sheet after the decoloring, which is conveyed by the second sheet conveying unit. The decoloring success or failure determining unit determines whether or not the decoloring in the decoloring unit is successful based on the reading result in the post-decoloring reading unit. The determination criterion setting unit sets a determination criterion in the decoloring success or failure determining unit, based on the type of image, which is determined by the type determining unit.

20 Claims, 17 Drawing Sheets

(56) References Cited

U.S. PATENT DOCUMENTS

| | | | | |
|---|---|---|---|---|
| 6,313,066 | B1 * | 11/2001 | Takayama | 503/201 |
| 6,373,575 | B1 * | 4/2002 | Takayama et al. | 356/445 |
| 7,945,189 | B2 * | 5/2011 | Yamashita | 399/121 |
| 8,081,347 | B2 * | 12/2011 | Tamada et al. | 358/3.28 |
| 8,274,710 | B2 * | 9/2012 | Yano et al. | 358/466 |
| 2005/0191082 | A1 * | 9/2005 | Takayama et al. | 399/101 |
| 2010/0290812 | A1 | 11/2010 | Taguchi | |
| 2010/0315475 | A1 * | 12/2010 | Taki et al. | 347/179 |

FOREIGN PATENT DOCUMENTS

| | | |
|---|---|---|
| JP | 07-242353 | 9/1995 |
| JP | 09-044042 | 2/1997 |
| JP | 10-153930 | 6/1998 |
| JP | 2005-266669 | 9/2005 |
| JP | 2006-133550 | 5/2006 |

* cited by examiner

DECOLORING DEVICE, METHOD OF DETERMINING DECOLORING SUCCESS OR FAILURE AND COMPUTER-READABLE RECORDING MEDIUM RECORDING DECOLORING SUCCESS OR FAILURE DETERMINING PROGRAM

CROSS-REFERENCE TO RELATED APPLICATION

This application is based upon and claims the benefit of priority from U.S. provisional application 61/312,080, filed on Mar. 9, 2010; U.S. provisional application 61/312,077, filed on Mar. 9, 2010; and U.S. provisional application 61/318, 229, filed on March 26; the entire contents of which are incorporated herein by reference.

FIELD

Embodiments described in the specification relate to a decoloring technique with respect to a specific document.

BACKGROUND

Conventionally, there is known a decoloring device that performs a decoloring process that heats a sheet, on which an image is printed by a decolorable coloring agent, to thereby decolor the image and that puts the sheet in a reusable state. In the decoloring device, there are cases where an undecolored residue remain on a sheet; however, in regard to a sheet on which a typical document is printed, even if a minute undecolored residue is present, it may be reused. However, in regard to a sheet on which a specific document such as a confidential document is printed, if the undecolored residue remain, it may not be reused.

In the conventional decoloring device, there is a problem that if the undecolored residue occurs on a sheet on which a specific document such as a confidential document is printed, the sheet cannot actually be reused, but the sheet may be regarded as a reusable sheet.

DETAILED DESCRIPTION

Figure 1:
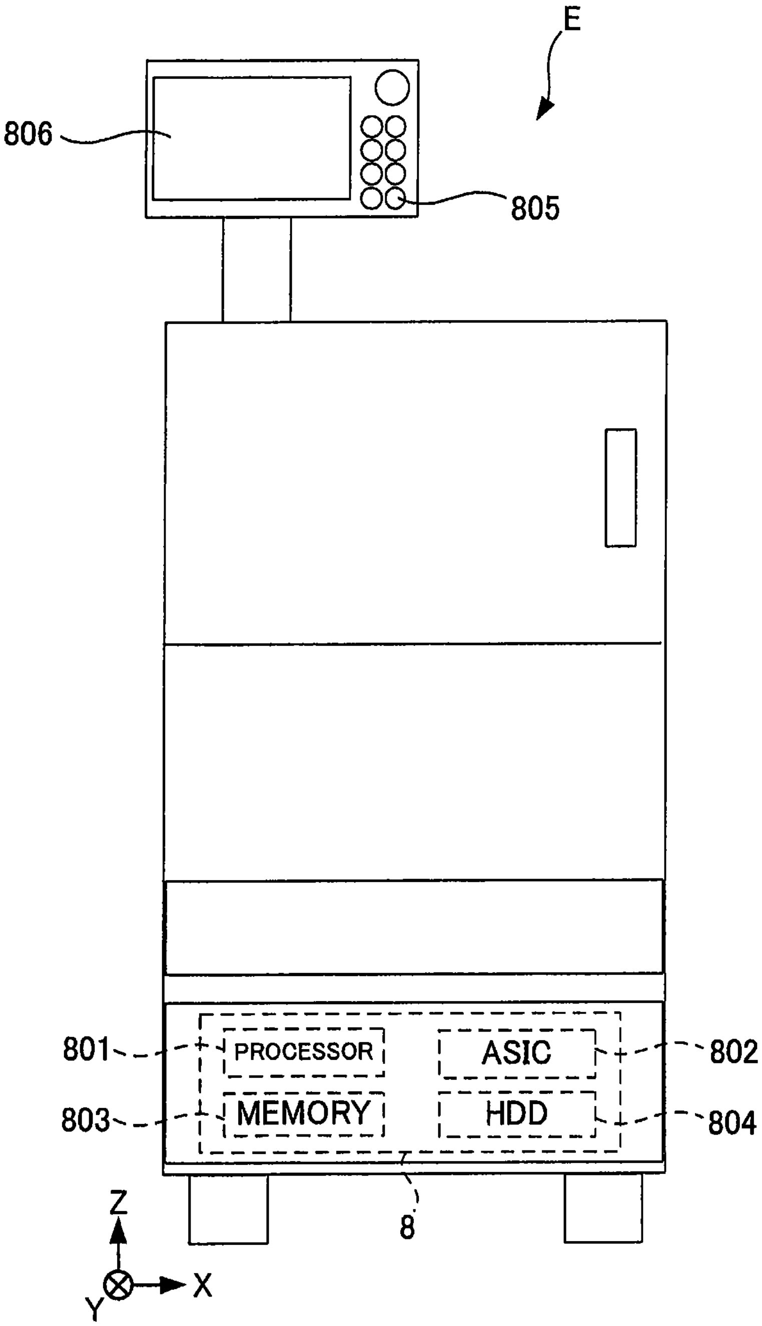
FIG. 1 is a front view illustrating the appearance of a decoloring device.

According to an embodiment of the invention, there is provided a decoloring device including a decoloring unit, a first sheet conveying unit, a pre-decoloring reading unit, a type determining unit, a second sheet conveying unit, a post-decoloring reading unit, a decoloring success or failure determining unit, and a determination criterion setting unit. The decoloring unit decolors an image on a sheet, which is formed by a decolorable coloring agent. The first sheet conveying unit conveys the sheet to the decoloring unit. The pre-decoloring reading unit reads the image on the sheet before the decoloring, which is conveyed by the first sheet conveying unit. The type determining unit determines the type of image on the sheet conveyed to decoloring unit based on the reading result in the pre-decoloring reading unit. The second sheet conveying unit conveys the sheet decolored by the decoloring unit. The post-decoloring reading unit reads the image on the sheet after the decoloring, which is conveyed by the second sheet conveying unit. The decoloring success or failure determining unit determines whether or not the decoloring in the decoloring unit is successful based on the reading result in the post-decoloring reading unit. The determination criterion setting unit sets a determination criterion in the decoloring success or failure determining unit, based on the type of image, which is determined by the type determining unit.

According to another embodiment of the invention, there is provided a decoloring success or failure determining method by a decoloring device including a decoloring unit that decolors an image on a sheet, which is formed by a decolorable coloring agent, a first sheet conveying unit that conveys the sheet to the decoloring unit, a pre-decoloring reading unit that reads the image on the sheet before the decoloring, which is conveyed by the first sheet conveying unit, a second sheet conveying unit that conveys the sheet decolored by the decoloring unit, and a post-decoloring reading unit that reads an image on the sheet after the decoloring, which is conveyed by the second sheet conveying unit. The decoloring success or failure determining method includes determining the type of image on the sheet conveyed to the decoloring unit, based on the reading result in the pre-decoloring reading unit; setting a determination criterion related to a decoloring success or failure determination based on the determined type of image; and determining whether or not the decoloring in the decoloring unit is successful from the reading result in the post-decoloring reading unit based on the determination criterion.

According to still another embodiment of the invention, there is provided a computer-readable recording medium recording a decoloring success or failure determining program that allows a computer to execute a decoloring success or failure determination in a decoloring device including a decoloring unit that decolors an image on a sheet, which is formed by a decolorable coloring agent, a first sheet conveying unit that conveys the sheet to the decoloring unit, a pre-decoloring reading unit that reads the image on the sheet before the decoloring, which is conveyed by the first sheet conveying unit, a second sheet conveying unit that conveys the sheet decolored by the decoloring unit, and a post-decoloring reading unit that reads an image on the sheet after the decoloring, which is conveyed by the second sheet conveying unit. The recording medium records the decoloring success or failure determining program allowing the computer to execute the determination of the type of image on the sheet conveyed to decoloring unit, based on the reading result in the pre-decoloring reading unit; the setting of a determination criterion related to the decoloring success or failure determination based on the determined type of image; and the determination of whether or not the decoloring in the decoloring unit is successful from the reading result in the post-decoloring reading unit based on the determination criterion.

Hereinafter, an embodiment will be described with reference to accompanying drawings.

FIG. 1 shows a front view illustrating the appearance of a decoloring device E.

The decoloring device E performs "decoloring" that, with respect to a sheet on which an image is formed by a "decolorable coloring agent" such as a so-called decolorable toner and a decolorable ink, decolors a color of the decolorable coloring agent.

The decoloring device E includes a control unit 8, an operation input unit 805 and a display 806.

The control unit 8 controls the entirety of the decoloring device E. The control unit 8 includes a processor 801, an ASIC 802 (Application Specific Integrated Circuit), a MEMORY 803, and a HDD 804 (Hard Disk Drive). The processor 801 executes a program stored in the MEMORY 803 or the HDD 804 and thereby performs various processes in the decoloring device E. The processor 801 may be a CPU (Central Processing Unit) or an MPU (Micro Processing Unit). The ASIC 802 may perform a part of the processes performed by the process 801. The HDD 804 may be a flash memory. The MEMORY 803 may be a RAM (Random Access Memory), a ROM (Read Only Memory), DRAM (Dynamic Random Access Memory), an SRAM (Static Random Access Memory), a VRAM (Video RAM) or a flash memory.

The operation input unit 805 may be a keyboard, a mouse, a touch panel, a touchpad, a graphics tablet, or a dedicated button. The display 806 may be electronic paper, an LCD (Liquid Crystal Display), an EL (Electronic Luminescence), a PDP (Plasma Display Panel), or a CRT (Cathode Ray Tube). The operation input unit 805 and the display 806 may be integrally formed as a touch panel display.

Figure 2:
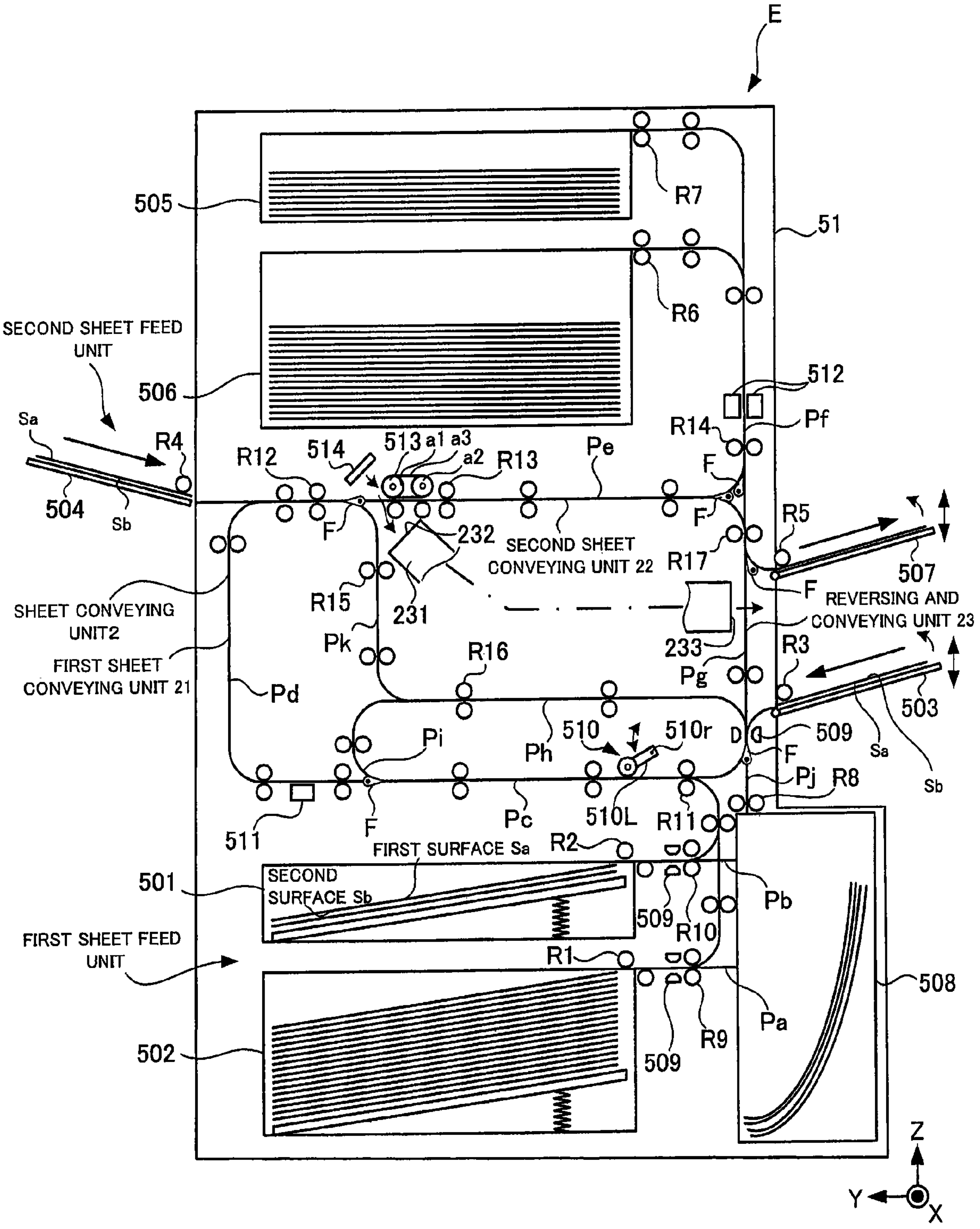
FIG. 2 is a longitudinal sectional view of the decoloring device.

FIG. 2 shows a longitudinal cross sectional view of the decoloring device E.

The decoloring device E includes cassettes 501 and 502, manual feed trays 503 and 504, discharge cassettes 505 and 506, a manual discharge tray 507, a reject box 508, a double feed sensor 509, a thickness sensor 510 (thickness detecting unit), a pre-decoloring reading unit 511, a post-decoloring reading unit 512 (image reading unit), a decoloring unit 513, a cooling fan 514, feed rollers R1 to R4, discharge rollers R5 to R8, and a sheet conveying unit 2. Each of these components is disposed inside a device outer wall 51, except for the manual trays 503, 504, and 507.

The cassettes 501 and 502 stack and accommodate sheets carrying an image, which are targets to be decolored. The sheets stacked and accommodated in the cassettes 501 and 502 have a specific size frequently used by a user. In this embodiment, the cassettes 501 and 502 stack and accommodate sheets having either an A4 size or an LT (letter) size.

The discharge cassettes 505 and 506 accommodate a sheet on which the decoloring is performed by the decoloring device E.

The reject box 508 accommodates a sheet that may not be reused.

The feed rollers R1 to R4 feed a sheet from the cassettes 501 and 502 and the manual feed trays 503 and 504 to the sheet conveying unit 2.

The discharge rollers R5 and R8 discharge the sheet from the sheet conveying unit 2 to the discharge cassettes 505 and 506, the manual discharge tray 507, and the reject box 508.

The sheet conveying unit 2 conveys a sheet supplied from the cassettes 501 and 502 and the manual feed trays 503 and 504 to the discharge cassettes 505 and 506, the manual discharge tray 507, and the reject box 508 along a specified conveying direction. The sheet conveying unit 2 includes conveying paths Pa to Pk that guide the sheet to a sheet conveying direction, conveying rollers R9 to R17 that convey the sheet along the conveying paths Pa to Pk, and flappers F which are provided at branch points of the conveying paths Pa to Pk and which assign the sheet to each branch.

The sheet conveying unit 2 includes a first sheet conveying unit 21, a second sheet conveying unit 22, and a reversing and conveying unit 23.

The first sheet conveying unit 21 conveys a sheet fed by the cassettes 501 and 502, the manual feed tray 504, and the feed rollers R1, R2 and R4 to the decoloring unit 513. The first sheet conveying unit 21 includes conveying paths Pc and Pd and conveying rollers R9 to R12. A first sheet feed unit feeds a sheet to the first sheet conveying unit 21. The first sheet feed unit includes cassettes 501 and 502, and feed rollers R1 and R2. A second sheet feed unit is located at a downstream side in relation to the pre-decoloring reading unit 511 and at an upstream side in relation to the decoloring unit 513 in the sheet conveying path by the first sheet conveying unit 21, and feeds a sheet to the first sheet conveying unit 21. The second sheet feed unit includes the manual feed tray 504 and the feed roller R4.

The manual feed tray 504 is located at a downstream side in relation to the pre-decoloring reading unit 511 and at an upstream side in relation to the decoloring unit 513 in the sheet conveying path by the first sheet conveying unit 21. On the manual feed tray 504, a sheet having a size other than a specific size frequently used by a user, such as a sheet having a size wider than a specific size (A4 size or LT size) frequently used by the user and a sheet having a size smaller than the above-described specific size are stacked. In this embodiment, on the manual feed tray 504, a sheet such as a sheet having an A3 size, a sheet having a size equal to or smaller than an A6 size that is a postcard size, and a long sheet having an irregular shape are stacked. An installation position of the manual feed tray 504 is located such that a conveying path connecting the manual feed tray 504 and the decoloring unit 513 substantially becomes a straight line.

The sheet conveying path by the first sheet conveying unit 21 has characteristics described below.

(a) The number of inflection points in a sheet conveying path from the second sheet feed unit to the decoloring unit 513 is smaller than that in a sheet conveying path from the first sheet feed unit to the decoloring unit 513.

(b) The total amount of the curved angle in a sheet conveying path from the second sheet feed unit to the decoloring unit 513 is smaller than that in a sheet conveying path from the first sheet feed unit to the decoloring unit 513.

(c) The average arrangement pitch of the conveying rollers in the sheet conveying path from the second sheet feed unit to the decoloring unit 513 is shorter than that in a sheet conveying path from the first sheet feed unit to the decoloring unit 513.

(d) A width in a sheet conveying path (path for feeding a sheet having a wide A3 size) from the second sheet feed unit to the decoloring unit 513 is wider than that in a sheet conveying path (path for feeding a sheet having an A4 size or LT size) from the first sheet feed unit to the decoloring unit 513, in a depth direction of the paper of FIG. 2, which is orthogonal to a sheet conveying direction.

The second sheet conveying unit 22 conveys a sheet of which the color has been decolored by the decoloring unit 513 toward the discharge cassettes 505 and 506 (sheet discharge opening). The second sheet conveying unit 22 includes conveying paths Pe and Pf, and conveying rollers R13 and R14.

The reversing and conveying unit 23 is disposed adjacently to the device outer wall 51. The reversing and conveying unit 23 conveys the sheet once again, which is temporarily brought into the second sheet conveying unit 22 after being decolored by the decoloring unit 513 and is switch-back conveyed to the second sheet conveying unit 22, to the first sheet conveying unit 21. Therefore, it is possible to allow a second surface Sb, which is opposite to a surface Sa on which a process by the pre-decoloring reading unit 511 and the decoloring unit 513 have been completed, to be processed by the pre-decoloring reading unit 511 and the decoloring unit 513. The reversing and conveying unit 23 includes a conveying path pg and the conveying roller R17. The reversing and conveying unit 23 includes a conveying guide 231. The conveying guide 231 includes a ventilation hole 232 at a position opposite to at least the cooling fan 514. The conveying guide 231 includes discharge hole 233 that is opposite to the reversing and conveying unit 23 and is communicated with the ventilation hole 232.

The manual feed tray 503 is provided at the device outer wall 51 adjacent to the reversing and conveying unit 23 and feeds a sheet to the reversing and conveying unit 23 by the feed roller R3. A size of a sheet stacked on the manual feed tray 503 is a specific size frequently used by a user. In this embodiment, sheets having either an A4 size or an LT size are stacked on the manual feed tray 503.

The manual discharge tray 507 is provided at a position of the device outer wall 51 adjacent to the reversing and conveying unit 23, which is different from the position of the manual feed tray 503 in a sheet conveying direction of the reversing and conveying unit 23. The manual discharge tray 507 discharges a sheet conveyed by the reversing and conveying unit 23 by using the discharge roller R5. In this embodiment, the manual discharge tray 507 is provided adjacent to a position where a sheet switch-back conveyed from the second sheet conveying unit 22 is brought into the reversing and conveying unit 23. In addition, the reversing and conveying unit 23 is located at an upstream side in relation to the manual feed tray 503 in a sheet conveying direction of the reversing and conveying unit 23.

Figure 3:
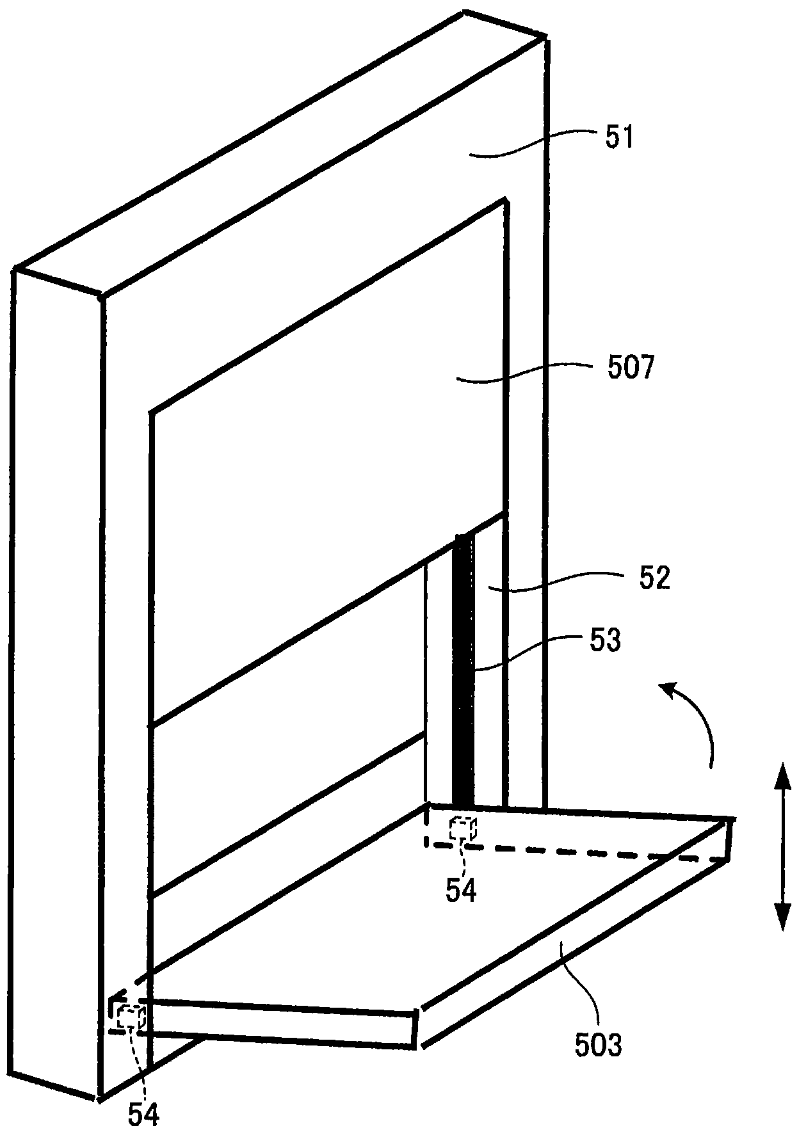
FIG. 3 is a perspective view illustrating a manual feed tray and a manual discharge tray.

FIG. 3 shows a perspective view illustrating the manual feed tray 503 and the manual discharge tray 507.

The manual feed tray 503 and the manual discharge tray 507 is supported to be foldable with respect to the device outer wall 51 and to be accommodated in an opening 52 formed in the device outer wall 51. Each of the trays 503 and 507 is vertically driven under the control of the control unit 8. On each portion of the wall surfaces of the opening 52, with which a side each of the trays 503 and 507 come into contact, vertically extending rails 53 are provided (in FIG. 3, one rail is shown). A supporting and moving body 54 that vertically moves on the rail 53 is provided on the rail 53. The supporting and moving body 54 supports each of the trays 503 and 507 to be foldable with respect to the outer wall 51. In addition, the supporting and moving body 54 vertically moves on the rail 53 under the control of the control unit 8 and thereby vertically drives each of the trays 503 and 507.

Returning to FIG. 2, the double feed sensor 509 detects a double feed of sheets fed from the cassettes 501 and 502 and outputs a detection signal to the control unit 8.

The thickness sensor 510 is located at an upstream side in relation to the pre-decoloring reading unit 511 in the sheet conveying direction by the first sheet conveying unit 21. The thickness sensor 510 detects a thickness of a sheet conveyed from the cassettes 501 and 502 to the decoloring unit 513 by the first sheet conveying unit 21. The thickness sensor 510 is configured by a lever type and includes a lever member 510L that is rotatably supported by a rotational shaft 510*r* as a supporting point. The lever member 510L is supported by the rotational shaft 510*r* as a supporting point and is forced in the counter clockwise direction of FIG. 2 by an elastic member such as a spring. When a sheet passes through the thickness sensor 510, the lever member 510L rotates in the clockwise direction of FIG. 2 corresponding to the thickness of the sheet. The thickness sensor 510 detects a rotational angle of the lever member 510L by using an optical sensor and outputs the detected signal to the control unit 8.

The pre-decoloring reading unit 511 is disposed at an upstream side in relation to the decoloring unit 513 in a sheet conveying direction. The pre-decoloring reading unit 511 is configured by an optical line sensor. A pre-decoloring sheet is conveyed to the pre-decoloring reading unit 511 by the first sheet conveying unit 21. The pre-decoloring reading unit 511 reads an image formed on a first surface Sa of the sheet. The pre-decoloring reading unit 511 detects a printed state (including density, brightness, contamination, spotting and creasing) of the image formed on the sheet.

The decoloring unit 513 heats the image formed on, for example, the first surface Sa of the sheet by a decolorable coloring agent to decolor the image. The decoloring unit 513 includes rollers a1 and a2 and a belt a3 wound around the rollers a1 and a2. At least one of the rollers a1 and a2 is controlled by the control unit 8 and is rotatably driven. At least one of the rollers a1 and a2 is heated by a heater controlled by the control unit 8. The decoloring unit 513 heats the sheet while conveying the sheet by the belt a3 and a roller opposite to the belt a3, and decolors the image on the sheet, which is formed from a decolorable coloring agent.

The cooling fan 514 is disposed laterally at a rear side of the decoloring unit 513. The cooling fan 514 blows a cooling air to the decoloring unit 513 to cool the decoloring unit 513. At the same time, the cooling fan 514 supplies a cooling air through the ventilation hole 232 and the discharge hole 233 to the sheet after being decolored, which is conveyed by the reversing and conveying unit 23.

The post-coloring reading unit 512 is disposed at a downstream side in relation to the decoloring unit 513 in the sheet conveying direction. The post-coloring reading unit 512 is configured by an optical type line sensor. The sheet after being decolored is conveyed to the post-coloring reading unit 512 by the second sheet conveying unit 22. The post-coloring reading unit 512 reads an image on the first surface Sa, which is processed by the pre-decoloring reading unit 511 and the decoloring unit 513, and an image on the second surface Sb, which is not processed. To the pre-decoloring reading unit 511, an A4 size sheet is fed from the cassettes 501 and 502. To the post-decoloring reading unit 512, an A3 size sheet is also fed from the manual feed tray 504 in addition to the A4 size sheet. Therefore, the width of the post-decoloring reading unit 512 is wider than that of the pre-decoloring reading unit 511 in a depth direction of the paper of FIG. 2, which is orthogonal to a sheet conveying direction.

Figure 4:
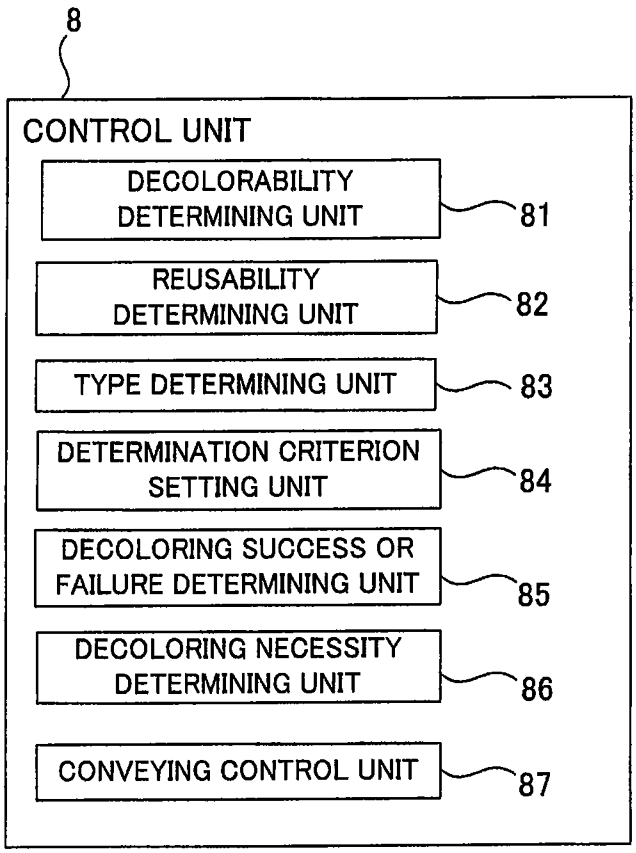
FIG. 4 is a view illustrating a configuration of a control unit.

FIG. 4 shows a configuration of the control unit 8.

The control unit 8 includes a decolorability determining unit 81, a reusability determining unit 82, a type determining unit 83, a determining criterion setting unit 84, a decoloring success or failure determining unit 85, a decoloring necessity determining unit 86 and a conveying control unit 87.

Figure 5:
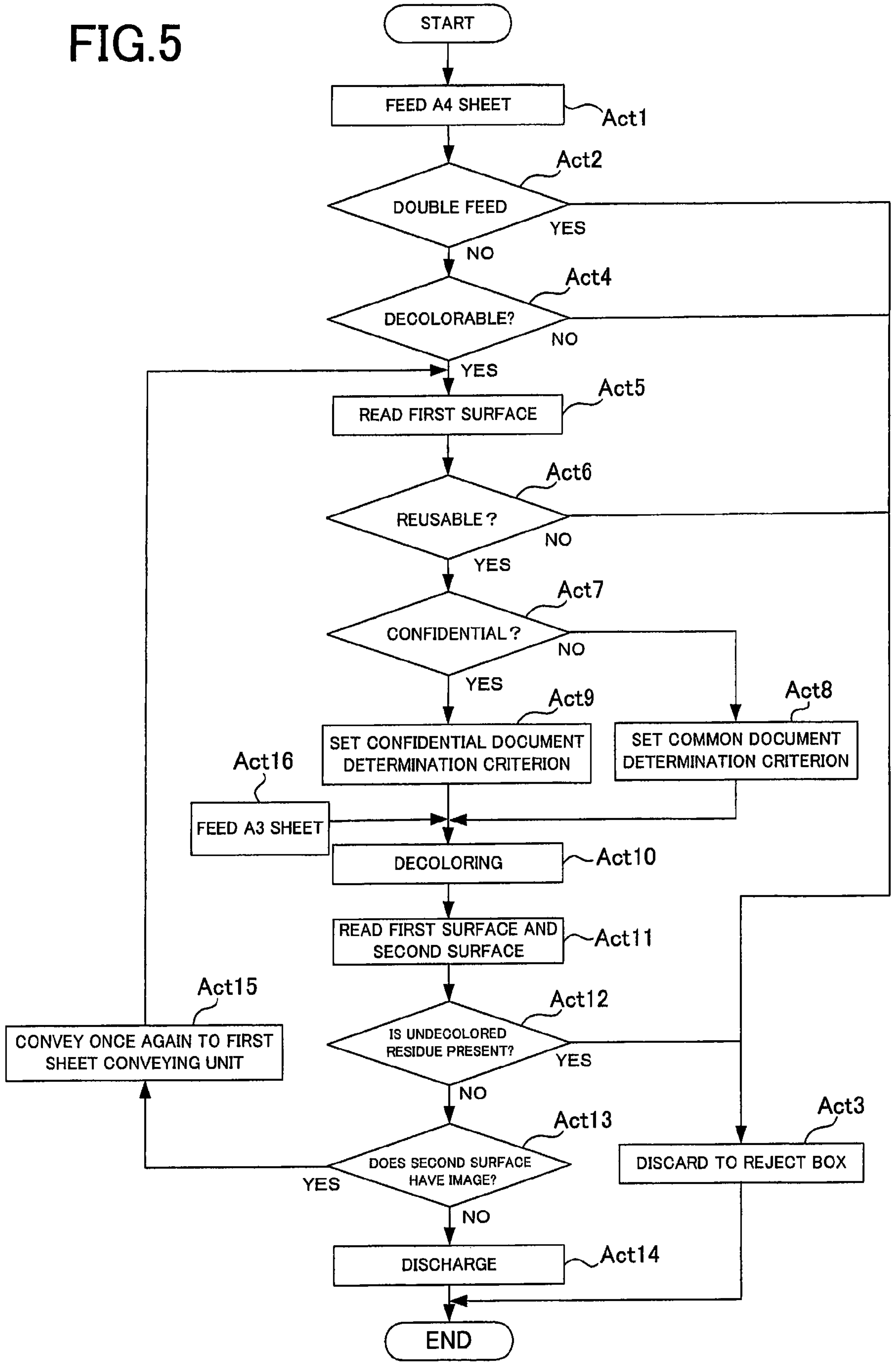
FIG. 5 is a flow chart illustrating a decoloring process performed by the decoloring device.

Hereinafter, the decoloring by the decoloring device E will be described with reference to a flow chart of FIG. 5. The decoloring is realized when the processor 801 obtains a program in the memory 803 and executes it.

First, the decoloring with respect to a sheet of an A4 size or the like that is frequently used by a user will be described.

The conveying control unit 87 controls the feed rollers R1 to R3 to feed an A4 size sheet from the cassettes 505 and 506 and the manual feed tray 503 to the first sheet conveying unit 21 (Act 1).

Figure 6:
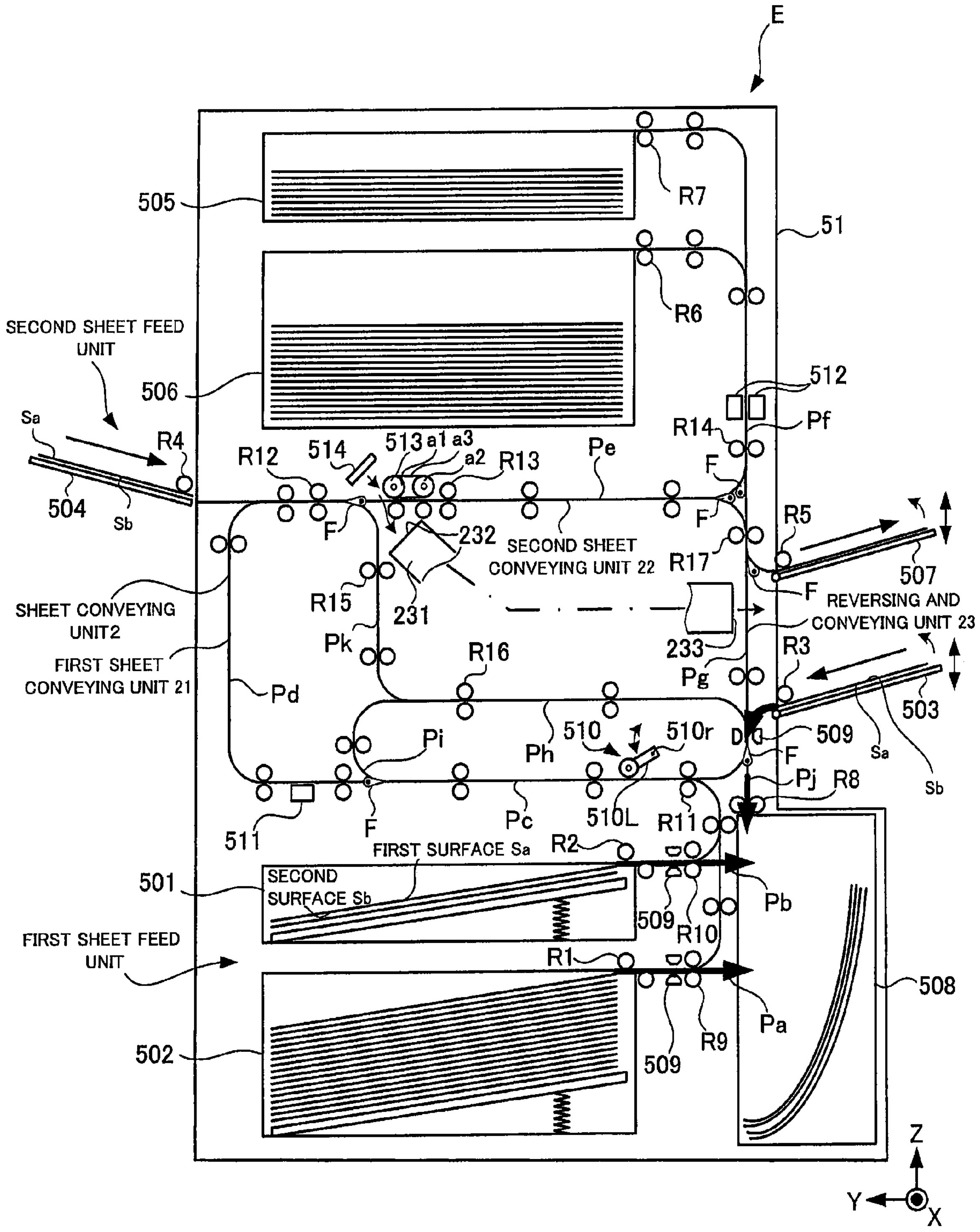
FIG. 6 is a view illustrating a conveying path for double-fed sheets.

After Act 1, when the double feed sensor 509 detects a double feed (Act 2: Yes), as shown by large arrows of FIG. 6, the conveying control unit 87 allows the conveying rollers 9 and 10 and the discharge roller R8 to discharge sheets, which are detected as double feed sheets, from the first sheet conveying unit 21 or the manual feed tray 503 to the reject box 508 via the conveying path Pa, Pb and Pj (Act 3).

Figure 7:
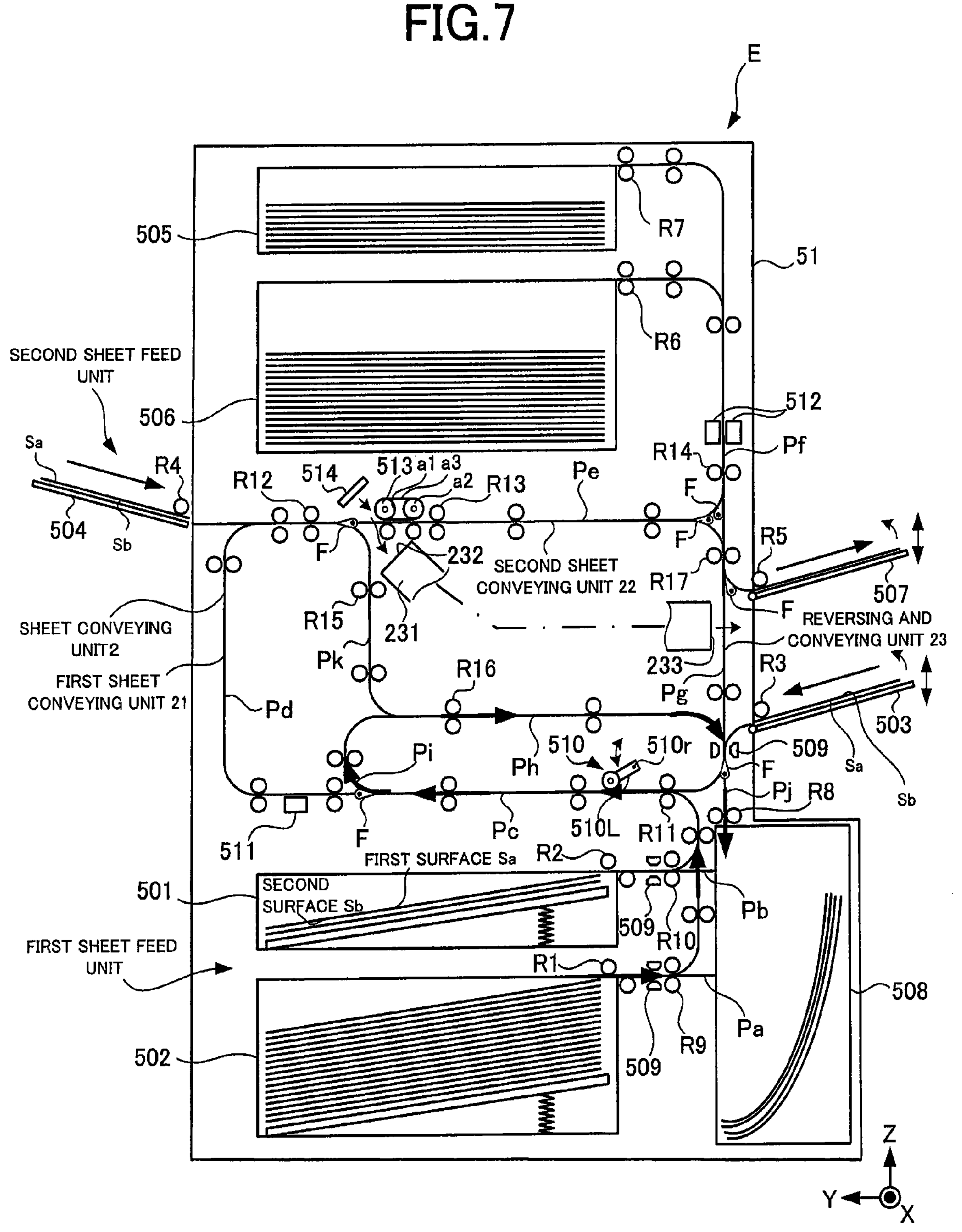
FIG. 7 is a view illustrating a conveying path for a sheet having a thickness of a threshold value or more.

After Act 1, when the double feed sensor 509 does not detect a double feed (Act 2: No), the decolorability determining unit 81 determines whether or not a sheet, which is an object of which an image is to be read, is decolorable by the decoloring unit 513, based on a detection signal by the thickness sensor 510 (Act 4). Specifically, the decolorability determining unit 81 determines whether a thickness of the sheet is equal to or less than a threshold value. When the decolorability determining unit 81 determines that the thickness of the sheet exceeds the threshold value (Act 4: No), the conveying control unit 87, as shown in FIG. 7, discharges the sheet from the first sheet conveying unit 21 to the reject box 508 via the conveying paths Pk and Pj (Act 3).

When the decolorability determining unit 81 determines that the thickness of the sheet is equal to or less than the threshold value (Act 4: Yes), the conveying control unit 87 allows the first sheet conveying unit 21 to convey the sheet to the pre-decoloring reading unit 511 and allows the pre-decoloring reading unit 511 to read an image on the first surface Sa of the sheet (Act 5).

Figure 8:
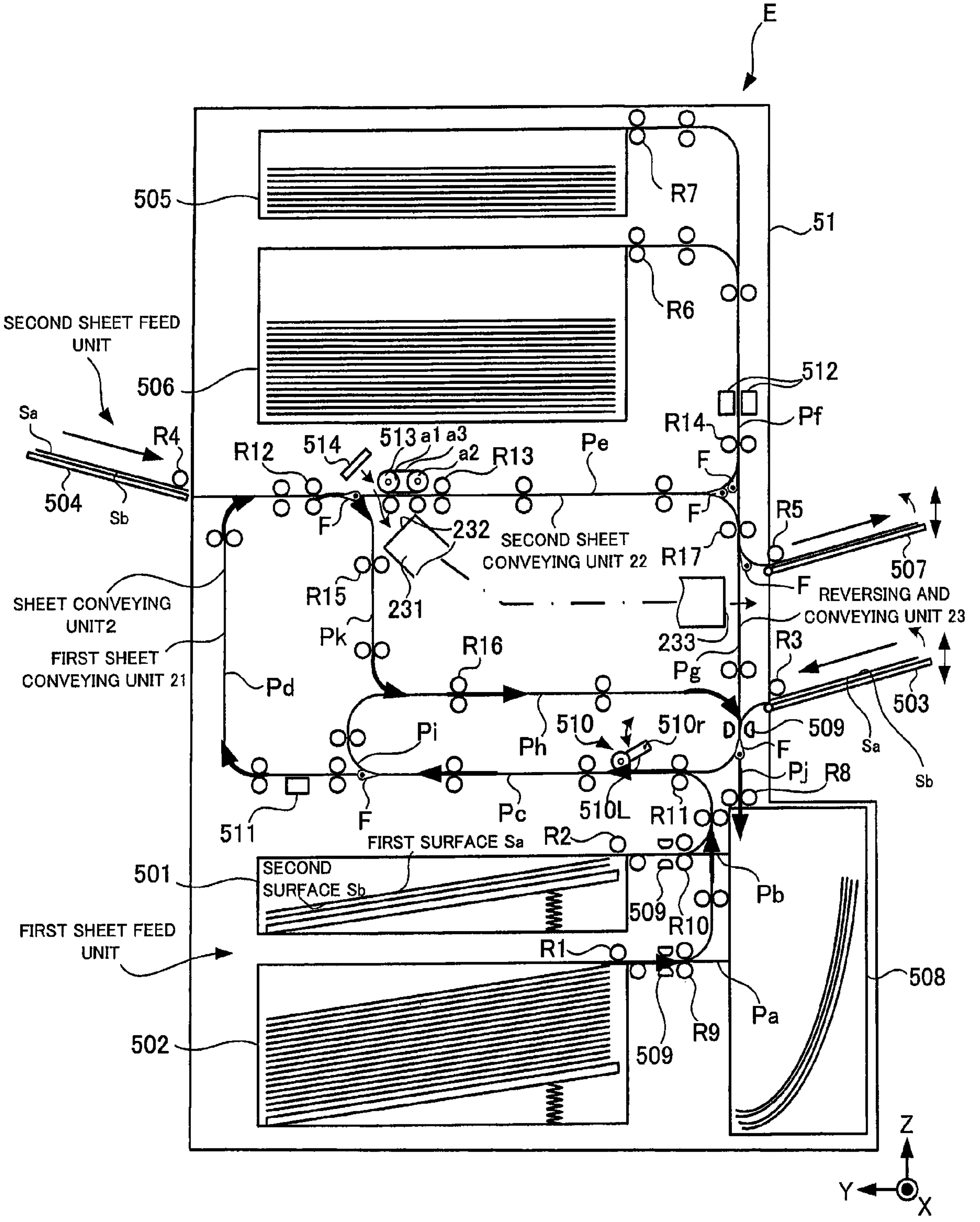
FIG. 8 is a view illustrating a conveying path for a sheet that is bent and thereby may not be reused.

After Act 5, the reusability determining unit 82 determines whether or not the sheet is reusable based on the read image (Act 6). Specifically, the reusability determining unit 82 determines whether or not contamination, spotting or creasing of the sheet exceeds a threshold value based on the read image. When the reusability determining unit 82 determines that the contamination or the like of the sheet exceeds the threshold value (Act 6: No), the conveying control unit 87, as shown in FIG. 8, discharges the sheet from the first sheet conveying unit 21 to the reject box 508 via the conveying paths Pk and Pj (Act 3).

When the reusability determining unit 82 determines that the contamination or the like of the sheet is equal to or less than the threshold value (Act 6: Yes), the type determining unit 83 determines the type of image based on the read image.

Figure 9:
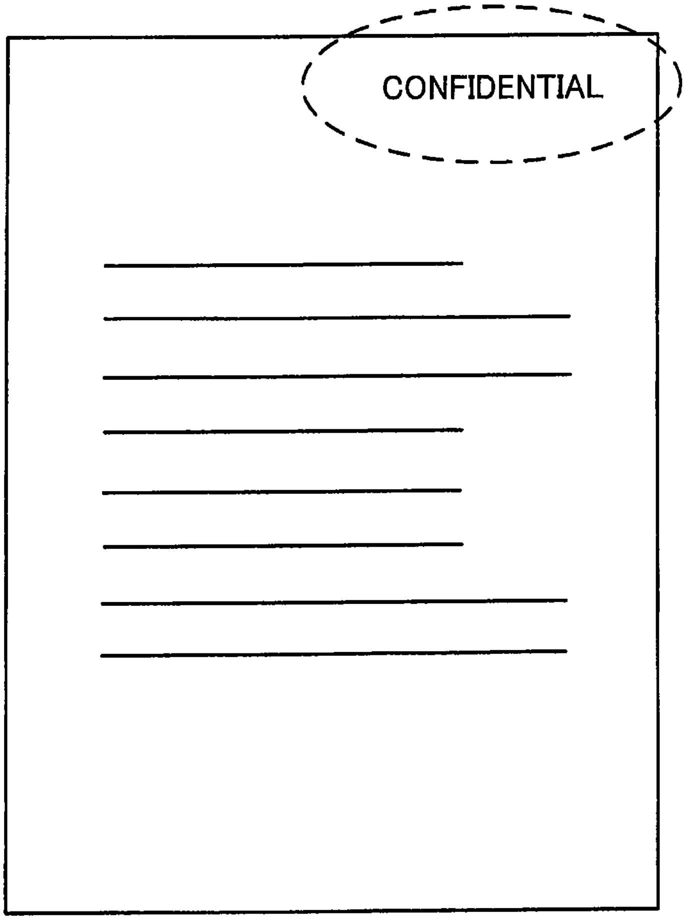
FIG. 9 is a view illustrating an example of a mark indicating a confidential document.

In this embodiment, the type determining unit 83 determines whether a confidential document or a common document based on the read image (Act 7). Specifically, a word or mark such as “confidential” indicating a confidential document is stored in the memory 803 in advance. The type determining unit obtains the word or mark indicating the confidential document from the memory 803. When the word or mark is present in the image (see, FIG. 9), the type determining unit 83 determines that the image of the sheet is a confidential document (Act 7: Yes). When the word or mark is not present in the image, the type determining unit 83 determines that the image is a common document (Act 7: No).

Figure 10:
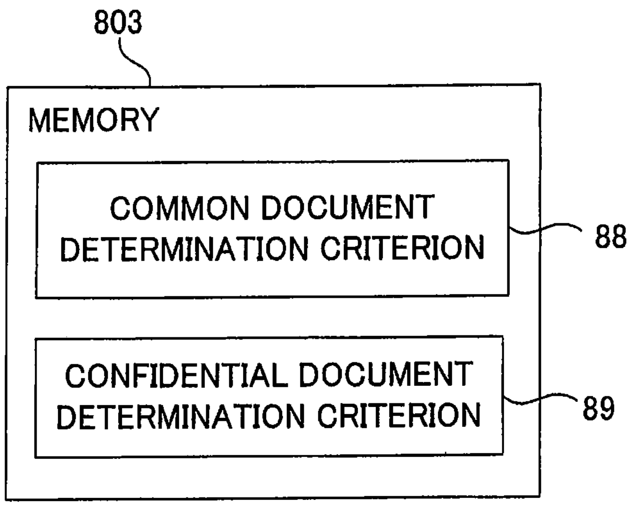
FIG. 10 is a view illustrating determination criteria stored in a memory.

As shown in FIG. 10, a common document determination criterion 88 and a confidential document determination criterion 89 including a setting value or a threshold value, which influences the determination of decoloring success or failure in the decoloring success or failure determining unit 85, are stored in the memory 803 in advance. The decoloring success or failure determining unit 85 determines the decoloring success or failure from the image read by the post-decoloring reading unit 512, which is an image of the sheet after being decolored, based on the determination criteria 88 and 89. The determination criteria 88 and 89 include a threshold value of a printing ratio, a printing density and a color brightness, that serving as a criterion at the time of determining the success or failure of decoloring from the image read by the post-decoloring reading unit 512. The determination criteria 88 and 89 include the number of agglomerated dots in the image, which is used at the time of determining the success or failure of the decoloring. The determination criteria 88 and 89 include a sheet conveying speed by the second sheet conveying unit 22 at the time of reading the image on the sheet by the post-decoloring reading unit 512, and a resolution at the time of reading the image on the sheet by the post-decoloring reading unit 512.

The confidential document determination criterion 89 is set to a criterion, by which it is easily determined that the decoloring is insufficient, stricter than the common document determination criterion 88. For example, the confidential document determination criterion 89 is set such that the threshold value of the printing ratio, the printing density and the color brightness is set to be lower than that of the common document determination criterion 88. The confidential document determination criterion 89 is set such that the number of agglomerated dots in the image, which is used at the time of determining the success or failure of the decoloring, is smaller than that of the common document determination criterion 88. The sheet conveying speed by the second sheet conveying unit 22 at the time of reading the image on the sheet by the post-decoloring reading unit 512 is set such that the speed in the confidential document determination criterion 89 is slower than that in the common document determination criterion 88. The resolution at the time of reading the image on the sheet by the post-decoloring reading unit 512 is set such that the resolution in the confidential document determination criterion 89 is higher than that in the common document determination criterion 88.

When the type determining unit 83 determines that the type of image is a common document (Act 7: No), the determination criterion setting unit 84 acquires the common document determination criterion 88 from the memory 803 and sets it as the common document determination criterion 88 (Act 8). Specifically, the determination criterion setting unit 84 sets the number of agglomerated dots in the image, which is used at the time of determining the success or failure of the decoloring, to the number of dots included in the common document determination criterion 88. The determination criterion setting unit 84 sets the sheet conveying speed by the second sheet conveying unit 22 at the time of reading the image on the sheet by the post-decoloring reading unit 512 to a sheet conveying speed included in the common document determination criterion 88. The determination criterion setting unit 84 sets the resolution at the time of reading the image on the sheet by the post-decoloring reading unit 512 to a resolution included in the common document determination criterion 88. The determination criterion setting unit 84 sets the threshold value of the printing ratio, the printing density and the color brightness used at the time of determining the decoloring success or failure to each threshold value included in the common document determination criterion 88.

When the type determining unit 83 determines that the type of image is the confidential document (Act 7: Yes), the determination criterion setting unit 84 acquires the confidential document determination criterion 89 by which it is easily determined that the decoloring is insufficient and which is strict from the memory 803 and sets it as the confidential document determination criterion 89 (Act 9). Specifically, the determination criterion setting unit 84 sets the number of agglomerated dots in the image, which is used at the time of determining the success or failure of the decoloring, to the number of dots included in the confidential document determination criterion 89 lower than that in the common document determination criterion 88. The determination criterion setting unit 84 sets the sheet conveying speed by the second sheet conveying unit 22 at the time of reading the image on the sheet by the post-decoloring reading unit 512 to a slow sheet conveying speed included in the confidential document determination criterion 89. The determination criterion setting unit 84 sets the resolution at the time of reading the image on the sheet by the post-decoloring reading unit 512 to a high resolution included in the confidential document determination criterion 89. The determination criterion setting unit 84 sets the threshold value of the printing ratio, the printing density and the color brightness used at the time of determining the decoloring success or failure to each low threshold value included in the confidential document determination criterion 89.

Therefore, when the image is determined as a confidential document by the type determining unit 83, if an undecolored residue is present, it is easily determined that the decoloring is insufficient, compared to the case where the image is determined as a common document by the type determining unit 83.

After Acts 8 and 9, the conveying control unit 87 allows the first sheet conveying unit 21 to convey the sheet to the decoloring unit 513 and allows the decoloring unit 513 to perform the decoloring process where the first surface Sa of the sheet is heated (Act 10).

The conveying control unit 87 allows the second sheet conveying unit 22 to convey the decolored sheet to the post-decoloring reading unit 512 at a speed included in the determination criteria 88 and 89. The conveying control unit 87 allows the post-decoloring reading unit 512 to read images on both surfaces Sa and Sb of the sheet based on resolutions included in the determination criteria 88 and 89 (Act 11).

The decoloring success or failure determining unit 85 determines whether or not the decoloring in the decoloring unit 513 is successful based on the image read by the post-decoloring reading unit 512, which is an image on the first surface Sa of the sheet on which the decoloring is completed (Act 12). When the printing ratio, the printing density and the color brightness of the image exceeds each threshold value included in the determination criteria 88 and 89, the decoloring success or failure determining unit 85 determines that the decoloring is insufficient (Act 12: Yes). When the printing ratio, the printing density and the color brightness of the image is equal to or less than each threshold value included in the determination criteria 88 and 89, the decoloring success or failure determining unit 85 determines that the decoloring is sufficient (Act 12: No). The number of agglomerated dots in the image, which is used by the decoloring success or failure determining unit 85 at the time of determining the success or failure of the decoloring, is the number of dots included in the determination criteria 88 and 89.

Figure 11:
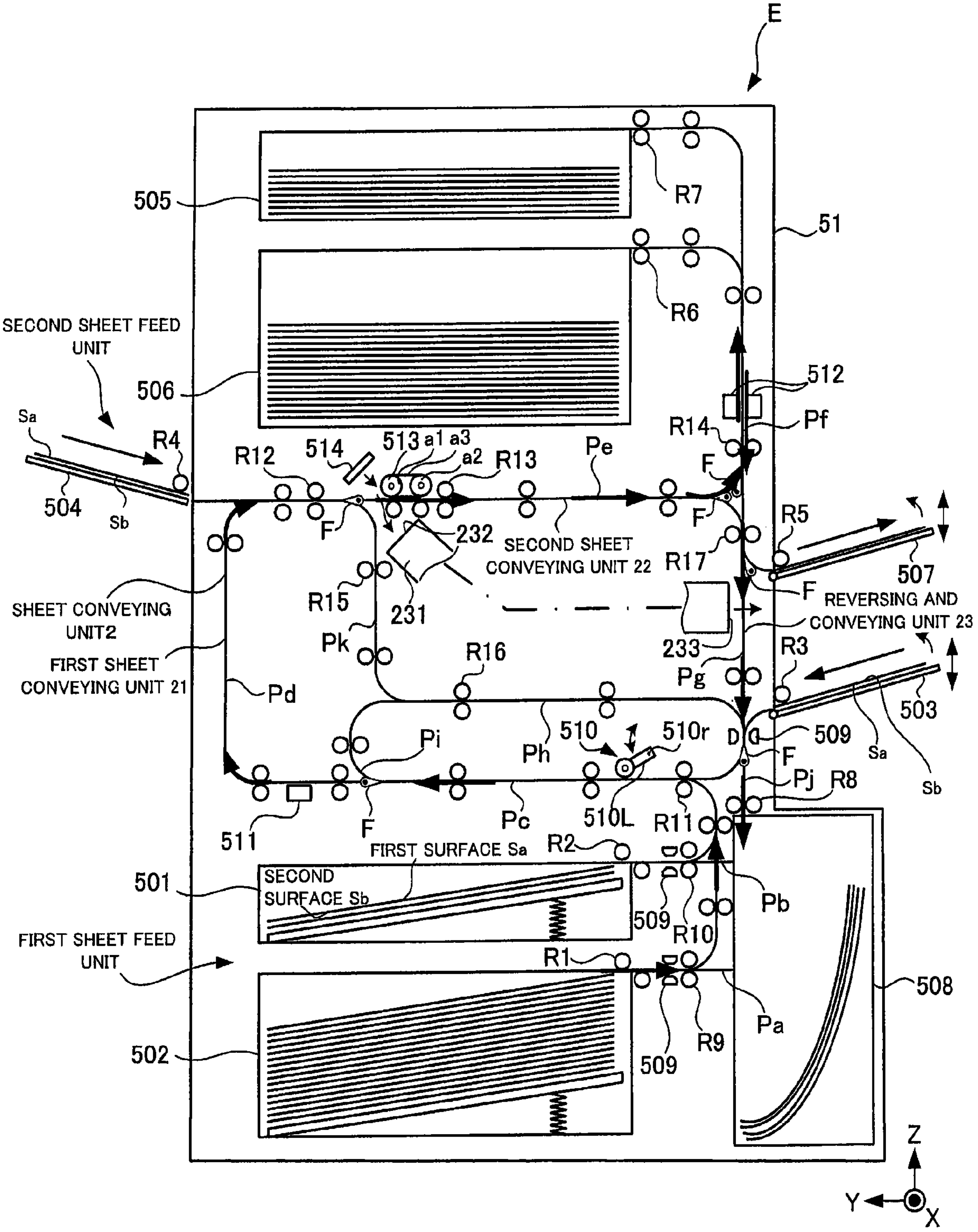
FIG. 11 is a view illustrating a conveying path of an insufficiently decolored sheet.

The conveying speed, the resolution, each of the threshold values, and the number of dots included in the confidential document determination criterion 89 is set to each value by which it is easily determined that the decoloring is insufficient, compared to each value included in the common document determination criterion 88. The decoloring success or failure determining unit 85 determines whether the decoloring is successful based on each of the determination criteria 88 and 89, such that it is possible to determine more precisely whether or not the decoloring is successful. When the decoloring success or failure determining unit 85 determines that the decoloring is insufficient (Act 12: Yes), the conveying control unit 87, as shown in FIG. 11, allows the second sheet conveying unit 22 to switch-back convey the sheet to convey the sheet from the second sheet conveying unit 22 to the reversing and conveying unit 23. The conveying control unit 87 discharges the sheet from the reversing and conveying path 23 to the reject box 508 via the conveying path Pj (Act 3).

When the decoloring success or failure determining unit 85 determines that the decoloring is sufficient (Act 12: No), the decoloring necessity determining unit 86 determines whether the decoloring is necessary based on the image read by the post-decoloring reading unit 512, which is an image on the second surface Sb of the sheet on which the decoloring is not performed (Act 13). When the printing ratio, the printing density and the color brightness of the image on the second surface Sb exceeds a threshold value, the decoloring necessity determining unit 86 determines that the decoloring with respect to the second surface Sb is necessary (Act 13: Yes). When the printing ratio, the printing density and the color brightness of the image on the second surface Sb is equal to or smaller than a threshold value, the decoloring necessity determining unit 86 determines that the decoloring with respect to the second surface Sb is not necessary (Act 13: No).

Figure 12:
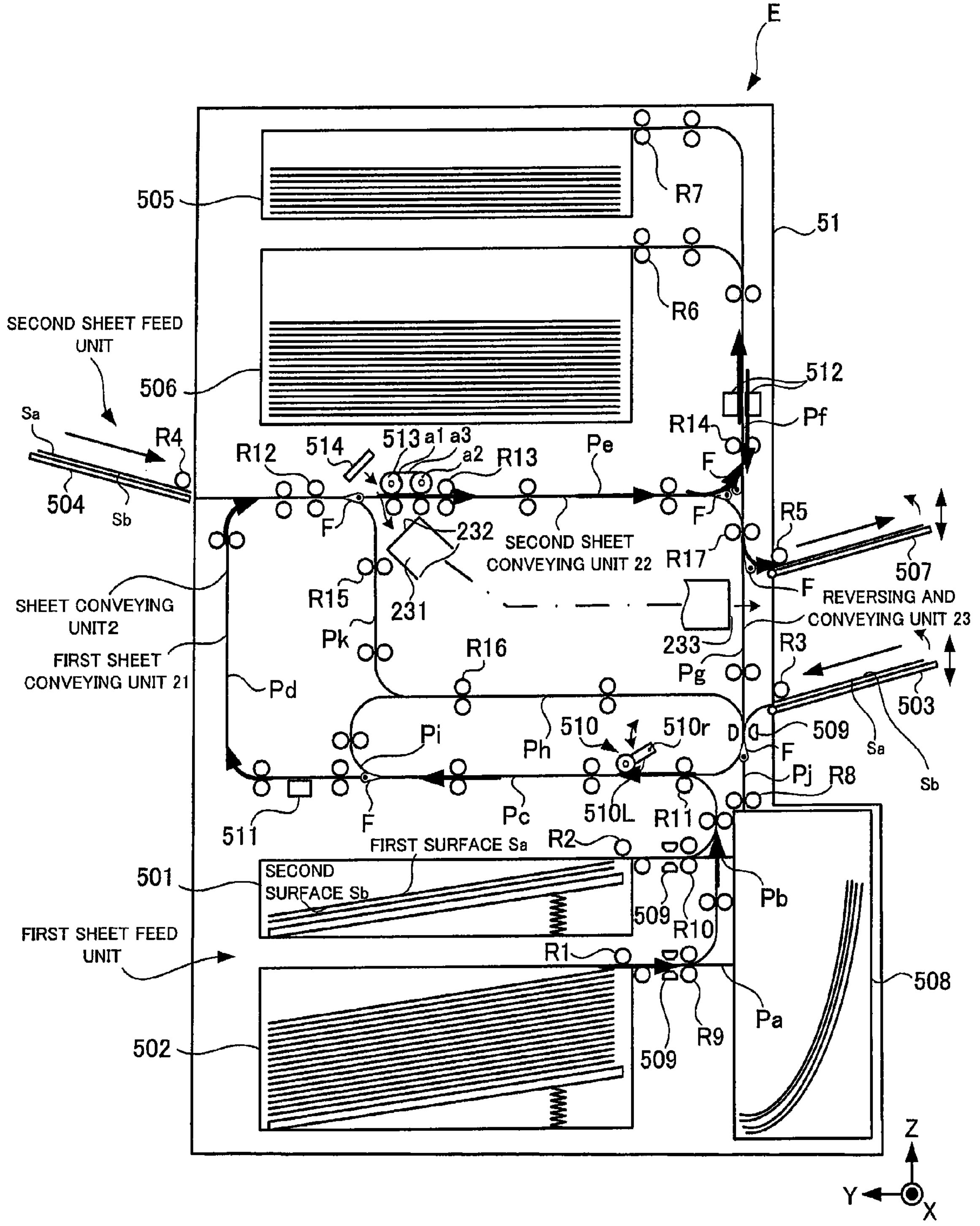
FIG. 12 is a view illustrating a conveying path of a sufficiently decolored sheet.
Figure 13:
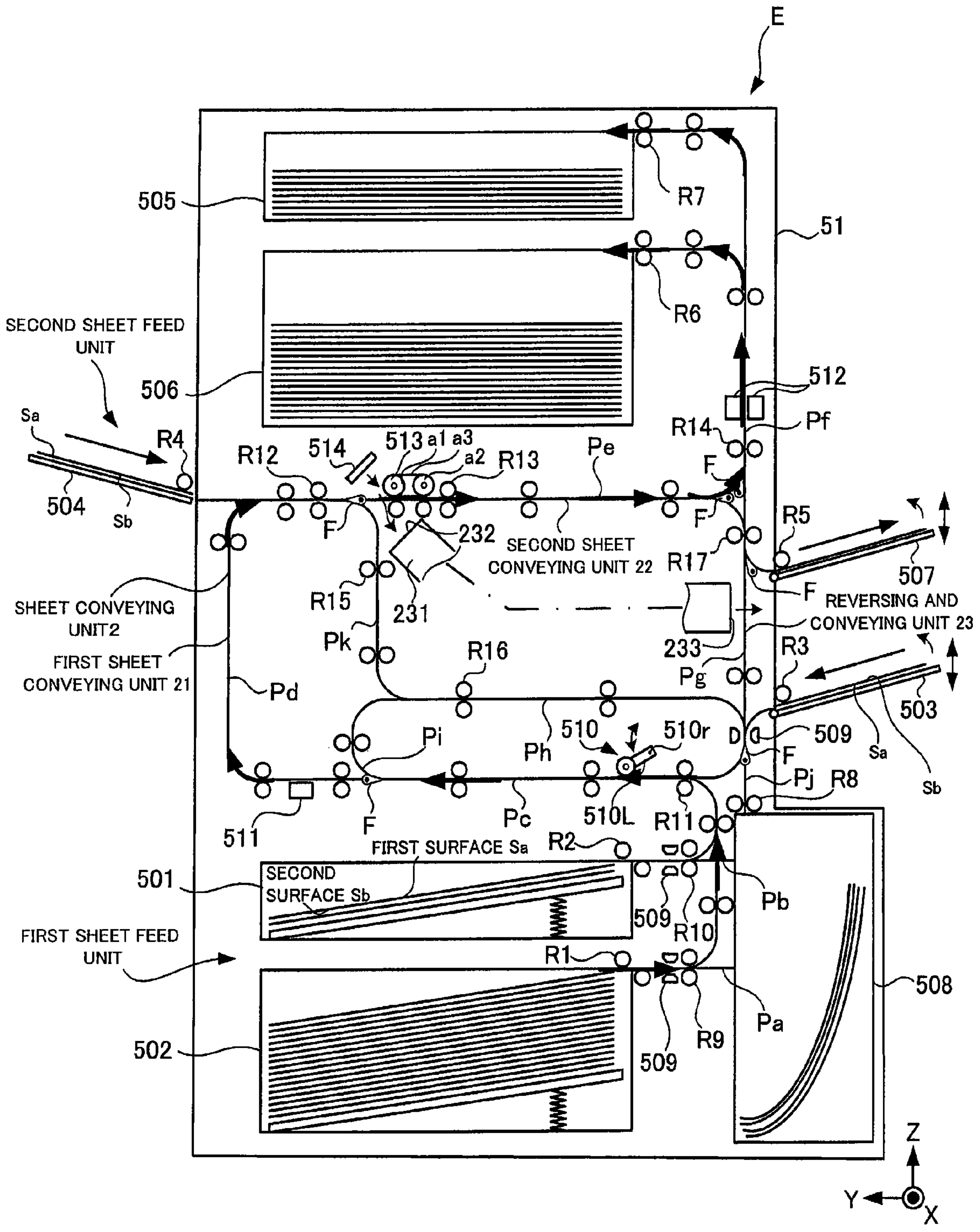
FIG. 13 is a view illustrating a conveying path in a case of discharging a sheet to a discharge cassette.

When the decoloring necessity determining unit 86 determines that the decoloring with respect to the second surface Sb is not necessary (Act 13: No), as shown in FIG. 12, the conveying control unit 87 allows the second sheet conveying unit 22 to switch-back convey the sheet to the reversing and conveying unit 23 and allows the reversing conveying unit 23 and the discharge roller R5 to discharge the sheet to the manual discharge tray 507 (Act 14). In addition, before the start of the decoloring, a user can set so that a sheet on which the decoloring is completed is discharged to the cassettes 505 and 506 by using the input operation unit 805. In this case, the conveying control unit 87 allows the second sheet conveying unit 22 and the discharge rollers 6 and 7 to discharge the sheet to the cassettes 505 and 506, at Act 14, as shown in FIG. 13.

Figure 14:
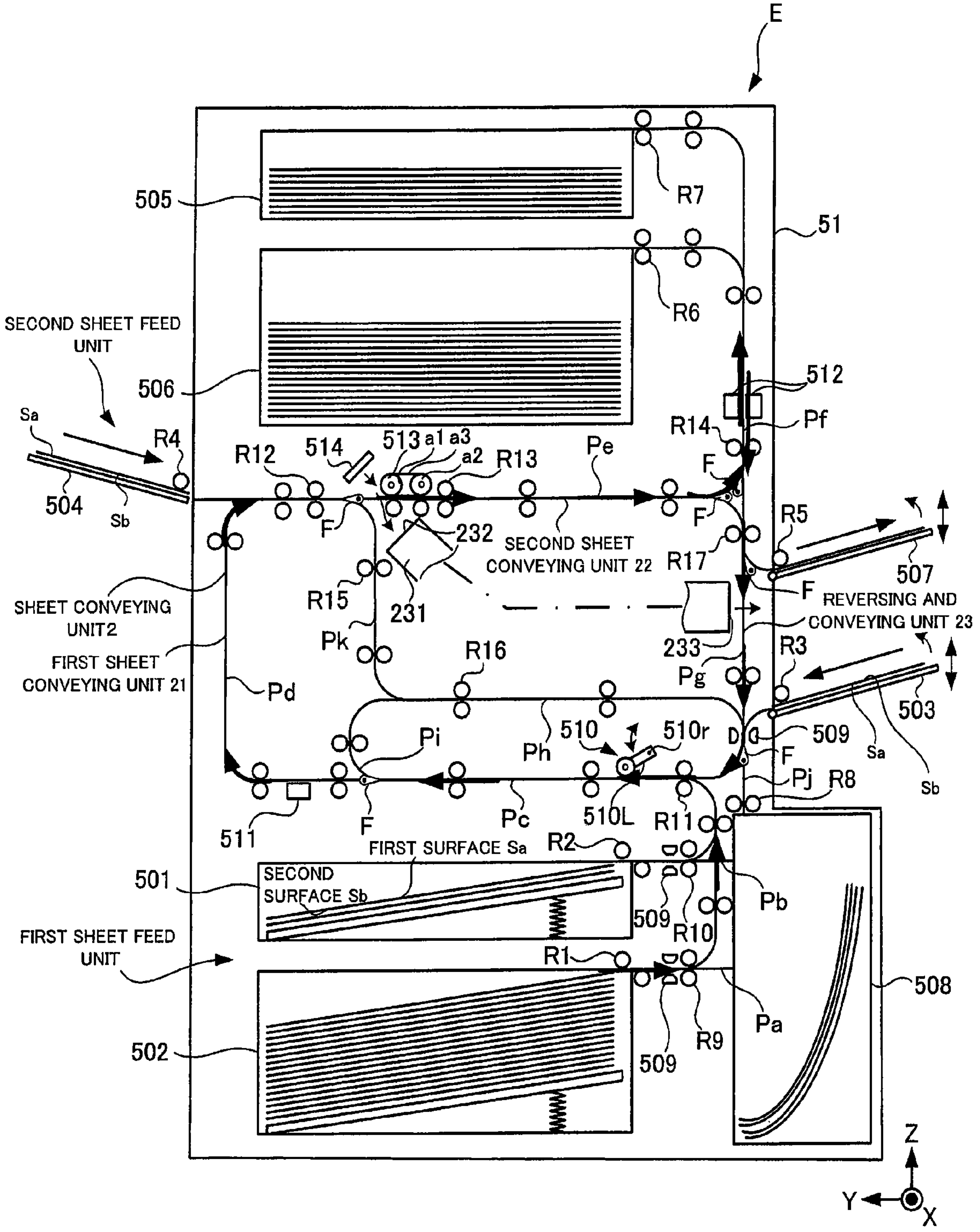
FIG. 14 is a view illustrating a conveying path of a sheet having an image required to be decolored on a rear surface thereof.

When the decoloring necessity determining unit 86 determines that the decoloring with respect to the second surface Sb is necessary (Act 13: Yes), as shown in FIG. 14, the conveying control unit 87 allows the second sheet conveying unit 22 to switch-back convey the sheet decolored by the decoloring unit 513 to the reversing and conveying unit 23. The conveying control unit 87 conveys once again the sheet from the reversing and conveying unit 23 to the first sheet conveying unit 21 (Act 15). Therefore, the second surface Sa becomes an object to be processed by the pre-decoloring reading unit 511 and the decoloring unit 513, and it returns to Act 5.

When the decoloring is performed with respect to an A3 size sheet or an A6 size sheet that is a post card size and a long size sheet, which are not frequently used by a user, the conveying control unit 87 controls the feed roller R4 to feed the A3 size sheet from the manual feed tray 504 to the first sheet conveying unit 21. The determination criterion setting unit 84 acquires, from the memory 803, the confidential document determination criterion 89 by which it is easily determined that the decoloring is insufficient and which is strict, and sets each value, which is related to the decoloring success or failure, to each value included in the confidential document determination criterion 89 (Act 16). After Act 16, the decoloring unit 513 performs the decoloring with respect to the first surface Sa (Act 10).

In the decoloring device E of this embodiment, it is determined whether an image of a sheet is a specific document such as a confidential document, and when the image of the sheet is a specific document, a determination criterion related to a decoloring success or failure after the decoloring is strictly set. Therefore, according to this embodiment, it is possible to precisely determine whether an undecolored residue is present on the specific document. Therefore, according to this embodiment, a sheet is discarded when the undecolored residue is present, it is possible to prevent a sheet that may not be reused from being regarded as a reusable sheet.

According to this embodiment, when an image on a sheet is a confidential document, the determination criterion is set to be stricter than that in a common document and it is determined that when the decoloring is insufficient, the confidential document is discarded. Therefore, it is possible to enhance security.

According to this embodiment, it is possible to provide a decoloring device described below.

(1) A decoloring device including:

a decoloring unit that decolors an image on a sheet, which is formed by a decolorable coloring agent;

a first sheet conveying unit that conveys the sheet to the decoloring unit;

a pre-decoloring reading unit that reads the image on the sheet before the decoloring, which is conveyed by the first sheet conveying unit;

a type determining unit that determines a type of image on the sheet conveyed to the decoloring unit, based on the reading result in the pre-decoloring reading unit;

a second sheet conveying unit that conveys the sheet decolored by the decoloring unit;

a post-decoloring reading unit that reads the image on the sheet after the decoloring, which is conveyed by the second sheet conveying unit;

a decoloring success or failure determining unit that determines whether or not the decoloring in the decoloring unit is successful based on the reading result in the post-decoloring reading unit;

a determination criterion setting unit that sets a determination criterion in the decoloring success or failure determining unit, based on the type of image, which is determined by the type determining unit.

(2) The decoloring device according to (1), wherein the decoloring success or failure determining unit determines whether or not the decoloring is successful in the decoloring unit based on the density of the image read by the post-decoloring reading unit.

(3) The decoloring device according to (1), wherein, if the type of image on the sheet conveyed to the decoloring unit is determined to be a predetermined highly confidential type by the type determining unit, the determination criterion setting unit sets the determination criterion in the decoloring success or failure determining unit to a determination criterion stricter than that set when the type of image is determined not to be a predetermined highly confidential type by the type determination unit.

(4) The decoloring device according to (3), wherein the determination criterion setting unit includes the density of the image on the sheet after the decoloring as the determination criterion and when the type of image on the sheet conveyed to the decoloring unit is determined to be a predetermined highly confidential type by the type determining unit, sets a density as the determination criterion to a density lower than that set when the type of image is determined not to be a predetermined highly confidential type by the type determination unit.

(5) The decoloring device according to (3), wherein the determination criterion setting unit includes a dot size of the image on the sheet after the decoloring as the determination criterion and when the type of image on the sheet conveyed to the decoloring unit is determined to be a predetermined highly confidential type by the type determining unit, sets a dot size as the determination criterion to a size smaller than that set when the type of image is determined not to be a predetermined highly confidential type by the type determination unit.

(6) The decoloring device according to (3), wherein when the type of image on the sheet conveyed to the decoloring unit is determined to be a predetermined highly confidential type by the type determining unit, the determination criterion setting unit sets a sheet conveying speed of the second sheet conveying unit when the post-decoloring reading unit reads the image on the sheet to a speed slower than that set when the type of image is determined not to be a predetermined highly confidential type by the type determination unit.

(7) The decoloring device according to (3), wherein when the type of image on the sheet conveyed to the decoloring unit is determined to be a predetermined highly confidential type by the type determining unit, the determination criterion setting unit sets a resolution when the post-decoloring reading unit reads the image on the sheet to a resolution higher than that set when the type of image is determined not to be a predetermined highly confidential type by the type determination unit.

(Decoloring Technique with Respect to Sheets Having Various Sizes)

Conventionally, there is known a decoloring device that performs a decoloring process that heats a sheet, on which an image is printed by a decolorable coloring agent, to decolor an image and that allows the sheet to be reusable. Even though decoloring is performed with respect to a sheet on which stapling is completed, it may be difficult to reuse. Therefore, there is a case where in a decoloring device, a thickness of the sheet is detected before the decoloring and it is detected whether or not stapling has been performed on the sheet.

In the meantime, most of the sheets on which the decoloring is performed by the decoloring device have a specific size. A user rarely desires to decolor sheets having other sizes, but the user does pay attention to a decoloring device capable of decoloring sheets having other sizes.

However, when the device is configured such that the thickness is detected for sheets of every size and the completion of stapling is detected, there are problems that the configuration of the device may be complex, and an increase in the size and cost of the device may be generated.

According to an embodiment of the invention, a thickness is detected and a decolorability is determined with respect to sheets having an A4 size or the like that is frequently used by a user, but with respect to a sheet having an A3 size or an A6 size, which is a postcard size or smaller, and a long size sheet, the decoloring is performed without determining decolorability. Therefore, the configuration of the decoloring device E may be simple, and the miniaturization of the device and reduction in cost may be obtained.

A First Reference Example

Hereinafter, there will be described a first reference example where the decoloring is performed without determining decolorability with respect to a rarely used sheet such as an A3 size sheet, a sheet having A6 size, which is a postcard size, or smaller and a long size sheet. Like reference numerals will be given to like parts having substantially similar functions, and redundant description thereof will be omitted.

Figure 15:
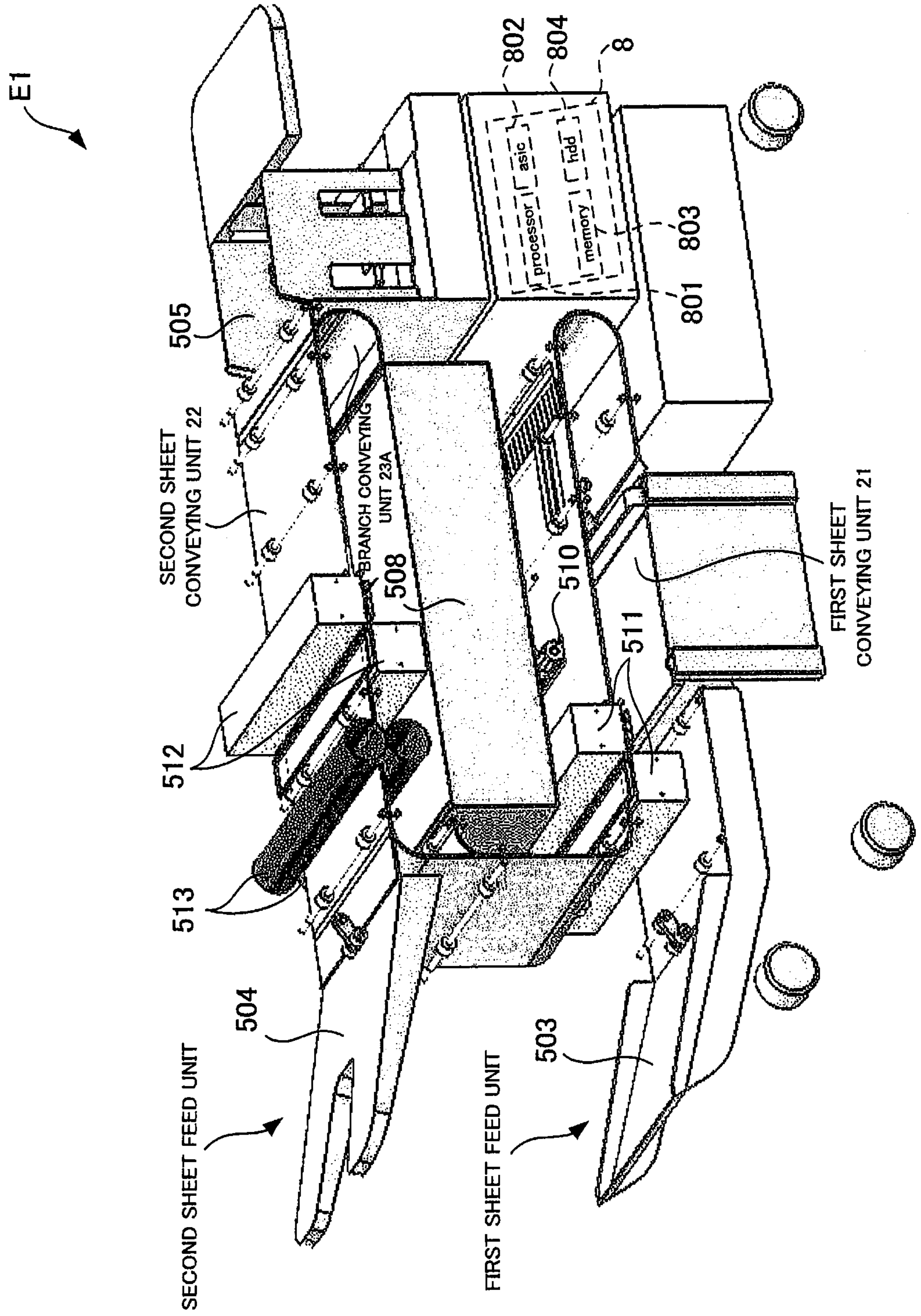
FIG. 15 is a perspective view illustrating a schematic configuration of a decoloring device of a first reference example.
Figure 16:
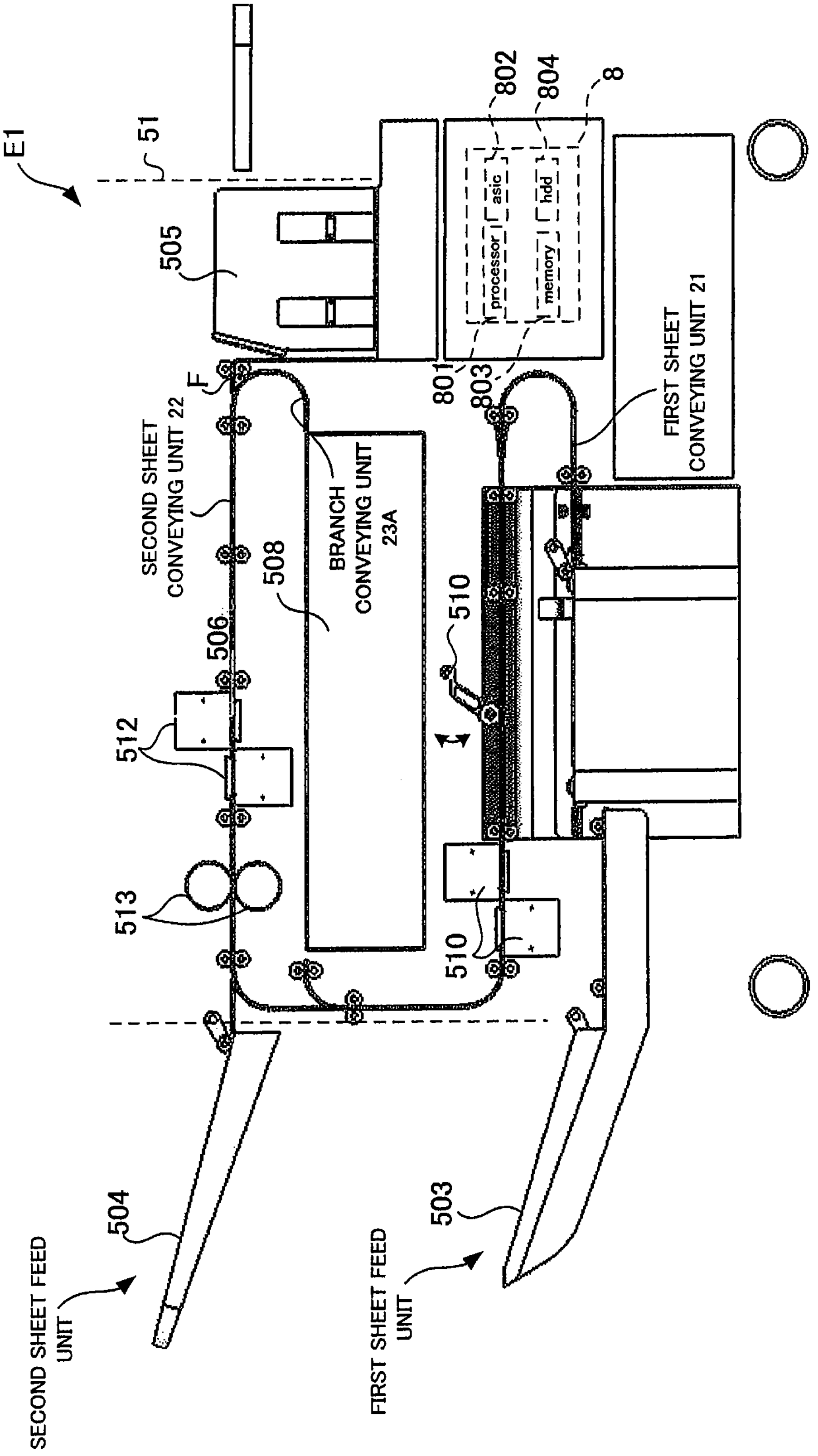
FIG. 16 is a cross sectional view of the decoloring device of the first reference example.

FIG. 15 shows a perspective view illustrating a schematic configuration of a decoloring device E1 and FIG. 16 shows a cross sectional view illustrating a schematic configuration of the decoloring device E1.

The decoloring device E1 includes manual feed trays 503 and 504 (first sheet feed unit and second sheet feed unit), a discharge cassette 505 (discharge opening), a reject box 508, a thickness sensor 510 (thickness detection unit), a pre-decoloring reading unit 511, a post-decoloring reading unit 512 (image reading unit), a decoloring unit 513, a first sheet conveying unit 21, a second sheet conveying unit 22, a branch conveying unit 23A, flappers F (FIG. 16), and a control unit 8. Each of these components is disposed inside a device outer wall 51 (FIG. 16).

The pre-decoloring reading unit 511 reads both surfaces of a sheet conveyed by the first sheet conveying unit 21. The decoloring unit 513 performs the decoloring with respect to both surfaces of the sheet conveyed by the first sheet conveying unit 21.

First, a process where the decoloring device E1 performs decoloring with respect to a sheet having an A4 size or the like, which is frequently used by a user, will be described.

Similarly to the above-described embodiment, the decoloring device E1 obtains a sheet having an A4 size or the like, which is frequently used by a user, from the manual feed tray 503, detects the thickness and spotting or creasing on both surfaces of the sheet by the thickness sensor 510 and the pre-decoloring reading unit 511 and determines whether or not the sheet is decolorable. When it is determined that at least one surface of the sheet is undecolorable, the decoloring device E1 discharges the sheet to the reject box 508 by the sheet conveying units 22 and 23A. When it is determined that both surfaces of the sheet are decolorable, the decoloring unit E1 determines the type of the sheet based on the read image. When it is determined that the images on both surfaces of the sheet are common documents, the decoloring device E1 acquires the common document determination criterion 88 (FIG. 10) from the memory 803 and sets each value to each value included in the common document determination criterion 88. Specifically, the decoloring device E1 sets the number of agglomerated dots in the image, which is used at the time of determining the success or failure of the decoloring, a sheet conveying speed at the time of reading the image on the sheet by the post-decoloring reading unit 512, a resolution at the time of reading the image on the sheet by the post-decoloring reading unit 512, and a printing ratio, a printing density and a color brightness used at the time of determining the decoloring success or failure to each value included in the common document determination criterion. When it is determined that an image on at least one surface of the sheet is a confidential document, the decoloring device E1 acquires the confidential document determination criterion 89 (FIG. 10) from the memory 803 and sets each value to each value included in the confidential document determination criterion 89.

The decoloring device E1 performs the decoloring with respect to the sheet by using the decoloring unit 513. The decoloring device E1 reads an image on a surface on which the decoloring is performed by the post-decoloring reading unit 512, at the conveying speed and the resolution that are set. The decoloring device E1 determines whether or not the decoloring is successful from the read image based on a threshold value of the printing ratio, a threshold value of the printing density, and a threshold value of the color brightness that are set. When it is determined that the decoloring on the surface on which the decoloring is performed is sufficient, the decoloring device E1 discharges the sheet to the discharge cassette 505 by the second sheet conveying unit 22. When it is determined that the decoloring on any surface on which the decoloring is performed is insufficient, the decoloring device E1 sorts the sheet by the flappers F from the second sheet conveying unit 2 to the branch conveying unit 23A. The decoloring device E1 discharges the sheet from the branch conveying unit 23A to the reject box 508. In addition, when it is determined that the decoloring on any surface on which the decoloring is performed is insufficient, the decoloring device E1 may switch-back convey the sheet to the decoloring unit 513 by the second sheet conveying unit 22 and once again perform the decoloring with respect to the sheet.

Next, description will be given with respect to a process in a case where the decoloring is performed with respect to a rarely used sheet such as an A3 size sheet, a sheet having A6 size, which is a postcard size, or smaller and a long size sheet.

Similarly to the above-described embodiment, the decoloring device E1 obtains a sheet such as an A3 size sheet, a sheet having A6 size, which is a postcard size, or smaller and a long size sheet from the manual feed tray 504. At the same time, the decoloring device E1 acquires, from the memory 803, a confidential document determination criterion 89 by which it is easily determined that the decoloring is insufficient and which is strict and sets each value related to a decoloring success or failure to each value included in the confidential document determination criterion 89. The decoloring device E1 performs the decoloring with respect to at least one surface of the sheet by the decoloring unit 513. Then, the decoloring device E1 performs the determination of the decoloring success or failure and discharges the sheet to the cassette 505 or the reject box 508.

In the first reference example, a sheet conveying path, which connects the second sheet feed unit, the decoloring unit 513, the post-decoloring reading unit 512 and the discharge cassette 505 to which the sheet on which the decoloring is completed is discharged, is linearly formed.

According to this embodiment and first reference example, it is possible to provide a decoloring device having a configuration described below.

(1) A decoloring device including:

a decoloring unit that decolors an image on a sheet, which is formed by a decolorable coloring agent;

a first sheet conveying unit that conveys the sheet to the decoloring unit;

a first sheet feed unit that feeds the sheet to the first sheet conveying unit;

a thickness detecting unit that detects the thickness of the sheet conveyed by the first sheet conveying unit toward the decoloring unit from the first sheet feed unit;

a decolarability determining unit that determines whether or not the sheet, which is an object of which a thickness is detected, is decolorable by the decoloring unit based on a detection result in the thickness detection unit; and a second sheet feed unit that is disposed at a downstream side in relation to the thickness detecting unit and at an upstream side in relation to the decoloring unit in a sheet conveying path by the first sheet conveying unit and feeds the sheet to the first sheet conveying path.

(2) The decoloring device according to (1), further including:

a post-decoloring reading unit that reads the image on the sheet decolored by the decoloring unit; and a decoloring success or failure determining unit that determines whether or not the decoloring performed by the decoloring unit with respect to the sheet, which is an object of which an image is to be read, is successful, based on the reading result in the post-decoloring reading unit.

(3) The decoloring device according to (1), wherein the number of inflection points in a sheet conveying path from the second sheet feed unit to the decoloring unit is smaller than that in a sheet conveying path from the first sheet feed unit to the decoloring unit.

(4) The decoloring device according to (1), wherein a total amount of a curved angle in a sheet conveying path from the second sheet feed unit to the decoloring unit is smaller than that in a sheet conveying path from the first sheet feed unit to the decoloring unit.

(5) The decoloring device according to (1), wherein the average arrangement pitch of the conveying rollers in a sheet conveying path from the second sheet feed unit to the decoloring unit is shorter than that in a sheet conveying path from the first sheet feed unit to the decoloring unit.

(6) The decoloring device according to (1), wherein the width in a direction orthogonal to a sheet conveying direction in a sheet conveying path from the second sheet feed unit to the decoloring unit is wider than that in a sheet conveying path from the first sheet feed unit to the decoloring unit.

(7) The decoloring device according to (1), wherein the first sheet feed unit feeds an A4 size or letter size sheet to the first sheet conveying path, and the second sheet feed unit feeds an A3 size sheet to the first sheet conveying unit.

(8) The decoloring device according to (1), wherein the first sheet feed unit feeds an A4 size or letter size sheet to the first sheet conveying unit, and the second sheet feed unit feeds a sheet having A6 size or smaller to the first sheet conveying unit.

(9) The decoloring device according to (2), further including:

a pre-decoloring reading unit that reads the image on the sheet conveyed by the first sheet conveying unit toward the decoloring unit from the first sheet feed unit; and a reusability determining unit that determines whether or not the sheet, which is an object of which an image is to be read, is reusable based on a reading result in the pre-decoloring reading unit, wherein a width of the pre-decoloring reading unit in a direction orthogonal to a sheet conveying direction is wider than that of the post-decoloring reading unit.

(10) The decoloring device according to (2), wherein a sheet conveying path, which connects the second sheet feed unit, the decoloring unit and the post-decoloring reading unit, is linearly formed.

(Technique of Discharging a Sheet on which a Decoloring is Completed)

Conventionally, a decoloring device that performs a decoloring process that heats a sheet, on which an image is printed by a decolorable coloring agent, to decolor the image and that allows the sheet to be reusable state has been used. In such a decoloring device, a type having a manual feed section is known. The device decolors a sheet fed from the manual feed section and discharges the sheet on which the decoloring is completed to a cassette in the device.

However, in the device, there is inconvenience that the sheet on which the decoloring is completed is discharged to the cassette.

In this embodiment, since the sheet on which the decoloring is completed is discharged to a discharge tray 507, convenience may be increased.

In this embodiment, the first sheet conveying unit 21 conveys the sheet to the decoloring unit 513. In this embodiment, the reversing and conveying unit 23, which conveys the sheet on which the decoloring is completed to the first sheet conveying unit 21 once again, is disposed adjacently to the device outer wall 51. In this embodiment, the manual discharge tray 507 and the manual feed tray 503 are connected to the reversing and conveying unit 23, and they are provided closely to each other and thereby the convenience may be increased. Since the reversing and conveying unit 23 connected to the manual discharge tray 507 and the manual feed tray 503 is disposed adjacently to the device outer wall 51, even when a jam caused by the entrance and exit of the sheet in the manual discharge tray 507 and the manual feed tray 503 is generated, the jam may be easily solved.

When the configuration of the decoloring device E is adopted to an image forming apparatus, such as an MFP (Multi Functional Peripheral), it can be considered that for example, an image transfer unit that transfers an image to a sheet is provided in the first sheet conveying unit 21 and the decoloring unit 513 performs a heating and fixing process and a decoloring process. In this case, the image forming apparatus discharges the sheet on which an image is transferred to cassettes 505 and 506 from the second sheet conveying unit 21. When the sheet is decolored by the decoloring unit 513, the image forming apparatus discharges the sheet on which the decoloring is completed to the manual discharge tray 507. Specifically, since the manual discharge tray 507 and the manual feed tray 503 are connected to the reversing and conveying unit 23 disposed adjacently to the device outer wall 51, the decoloring device of this embodiment may be adopted to a conventional image forming apparatus without significant change. Therefore, it is possible to allow the conventional image forming apparatus to easily perform the decoloring, thereby realizing highly convenient apparatus.

Generally, when the sheet is decolored by heating, moisture therein evaporates and thereby curling may be generated in the sheet. In this embodiment, the manual discharge tray 507 is disposed at an upstream side in relation to the manual feed tray 503 in a sheet conveying direction, a travel distance from the decoloring device 513 to the manual discharge tray 507 becomes shorter than that when the manual discharge tray 507 is disposed at a downstream side in relation to the manual feed tray 503 in a sheet conveying direction. Therefore, in this embodiment, the generation of a sheet jam may be suppressed.

In this embodiment, since the cooling fan 514 cools the decoloring unit 513 and the decolored sheet, reduction in space may be realized compared to a case where the cooling fan is individually provided for each of the components.

A Second Reference Example

Figure 17:
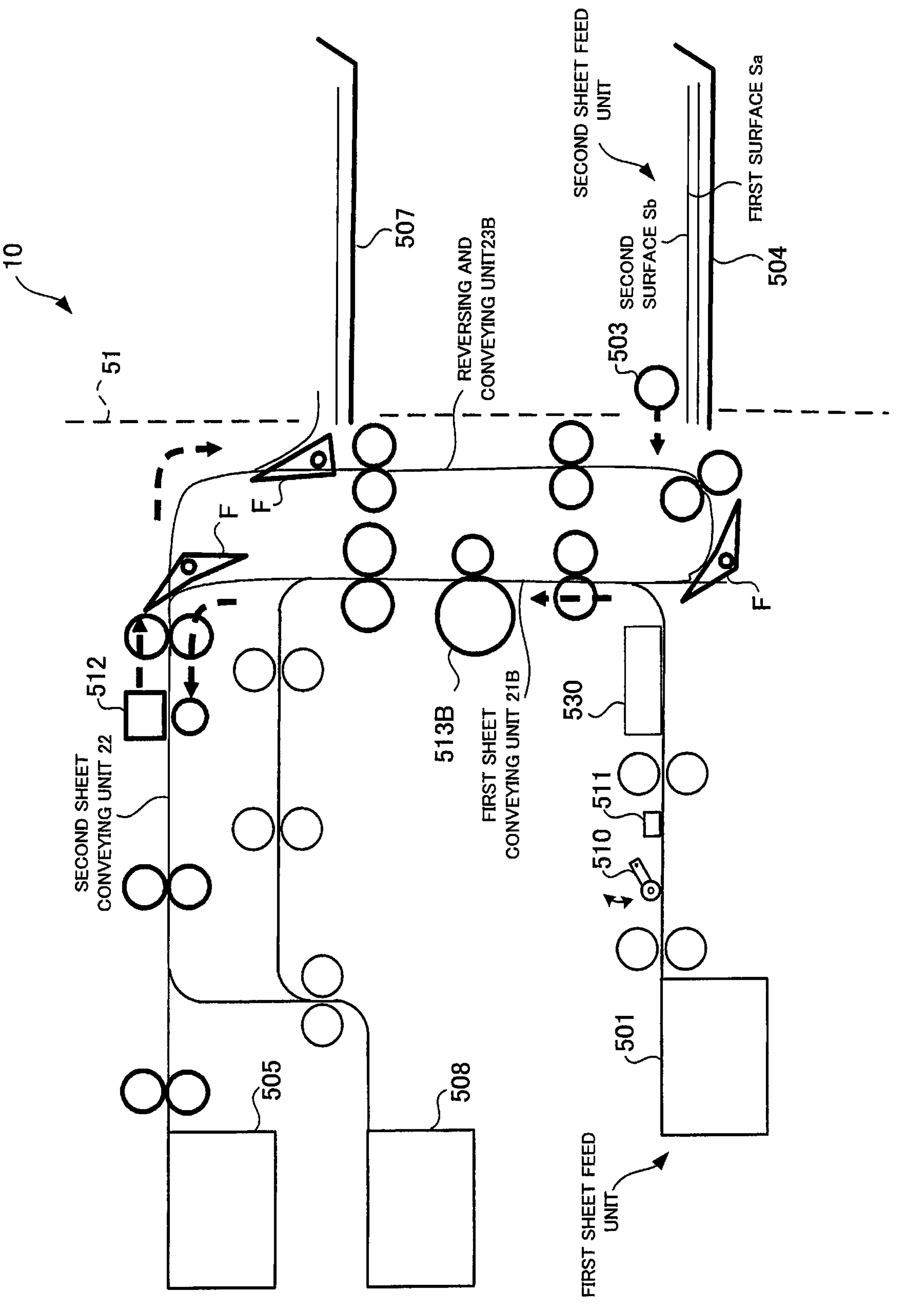
FIG. 17 is a schematic configuration view of an image forming device of a second reference example.

In the above-described embodiments, a part of the first sheet conveying unit 21 and the reverse and conveying unit 23 may be disposed along the device outer wall 51 in parallel therewith. For description of the conveying path of this case, a schematic configuration view of an image forming apparatus 10 of the second reference example is shown in FIG. 17. In description of the second reference example, like reference numerals will be given to like parts having substantially same functions, and redundant description thereof will be omitted.

The image forming apparatus 10 includes a cassette 501 in which an A4 size sheet or the like is stacked, a manual feed tray 504 (second sheet feed unit) on which an A3 size sheet, a sheet having A6 size, which is a postcard size, or smaller and a long size sheet are stacked, a discharge cassette 505 (discharge opening), a reject box 508, a thickness sensor 510 (thickness detection unit), a pre-decoloring reading unit 511, a post-decoloring reading unit 512 (image reading unit), a decoloring unit 513B, an image forming unit 530, a first sheet conveying unit 21B, a second sheet conveying unit 22, a reversing and conveying unit 23B, and flappers F. Each of these components is disposed inside a device outer wall 51.

The image forming unit 530 forms an image on a sheet using a decolorable coloring agent. The decoloring unit 513B heats the sheet and fixes the image onto the sheet or decolors the image.

When decoloring an image formed on an A3 size sheet, a sheet having A6 size, which is a postcard size, or smaller and a long size sheet, which are stacked on the manual feed tray 504, the image forming apparatus 10 acquires a confidential document determination criterion from the memory and sets each value to each value included in the confidential document determination criterion. The image forming apparatus 10 decolors an image on a first surface Sa of the sheet by the decoloring unit 513B and reads an image on a second surface Sb, which is opposite to the first surface Sa, by the post-decoloring reading unit 512. The image forming apparatus 10 determines whether or not the image on the second surface Sb is important, and when it is determined the decoloring with respect to the second surface Sb is necessary, the sheet of which the first surface Sa is decolored is switch-back conveyed to the reversing and conveying unit 23B by the second sheet conveying unit 22 and is conveyed once again to the first sheet conveying unit 21B from the reversing and conveying unit 23B. The image forming apparatus 10 decolors the second surface Sb of the sheet by the decoloring unit 513B.

In addition, the second reference example performs a decolorability determination with respect to A4 size sheet or the like, which is frequently used by a user, by using the thickness sensor 510 and the pre-decoloring reading unit 511, similarly to the above-described embodiment. The second reference example reads an image with respect to an A4 size sheet or the like by using the decoloring reading unit 511 and if the image is a common document, sets each value related to the decoloring success or failure to each value of the common document determination criterion, similarly to the above-described embodiment. The second reference example reads an image with respect to an A4 size sheet or the like by using the decoloring reading unit 511 and if the image is a confidential document, sets each value related to the decoloring success or failure to each value of the confidential document determination criterion.

According to this embodiment and the second reference example, it is possible to provide a decoloring device having a configuration described below.

(1) A decoloring device including:

a decoloring unit that decolors an image on a sheet, which is formed by a decolorable coloring agent;

a first sheet conveying unit that conveys the sheet to the decoloring unit;

a second sheet conveying unit that conveys the sheet decolored by the decoloring unit toward a sheet discharge opening;

a reversing and conveying unit that is disposed adjacently to a device outer wall in relation to the first sheet conveying unit, and conveys once again the sheet, which is temporary brought into the second sheet conveying unit after being decolored by the decoloring unit and is switch-back conveyed, to the first sheet conveying unit;

a manual feed tray that is provided at the outer wall adjacent to the reversing and conveying unit and feeds a sheet to the reversing and conveying unit;

a manual discharge tray that is provided at a position of the device outer wall adjacent to the reversing and conveying unit, which is different from the position of the manual feed tray in a sheet conveying direction of the reversing and conveying unit and discharges a sheet conveyed by the reversing and conveying unit.

(2) The device according to (1), wherein at least one of the manual feed tray and the manual discharge tray is supported to be foldable with respect to the device outer wall.

(3) The device according to (1), wherein at least one of the manual feed tray and the manual discharge tray is supported to be vertically movable with respect to the device outer wall.

(4) The device according to (1), wherein the manual discharge tray is provided adjacently to a position in the reversing and conveying unit where a sheet switch-back conveyed from the second sheet conveying unit is brought into the reversing and conveying unit.

(5) The device according to (1), wherein the manual discharge tray is disposed at an upstream side in relation to the manual feed tray in a sheet conveying direction in the reversing and conveying unit.

(6) The device according to (1), further including:

a cooling fan that cools the decoloring unit, wherein the decoloring unit decolors the image on the sheet, which is formed by the decolorable coloring agent, by heating, the reversing and conveying unit has a conveying guide with a ventilation hole formed at a position opposite to at least the cooling fan, and the cooling fan supplies a cooling air through the ventilation hole to the sheet after being decolored, which is conveyed by the reversing and conveying unit.

(7) The device according to (1), further including:

an image reading unit that reads an image on a second surface of the sheet, conveyed by the second sheet conveying unit after the decoloring is performed with respect to the first surface of the sheet by the decoloring unit;

a decoloring necessity determining unit that determines whether or not the decoloring is necessary with respect to the second surface of the sheet of which the image is read based on the reading result in the image reading unit; and a conveying control unit that switch-back conveys the sheet of which the first surface is decolored by the decoloring unit by the second sheet conveying unit and conveys the sheet once again to the first sheet conveying unit, when it is determined the decoloring with respect to the second surface is necessary by the coloring necessity determining unit, wherein the decoloring unit performs the decoloring with respect to one surface of the sheet.

Modified Example

In the above-described embodiment, in a case where it is determined that the image of the sheet is a confidential document, when an undecolored residue is present (Act 12: Yes), the sheet is discarded. However, the sheet may be switch-back conveyed to the decoloring unit 513 by the second sheet conveying unit 22 and the same surface may be decolored once again.

The decolorability determining unit 81 may function as the reusability determining unit 82. That is, the decolorability determining unit 81 may determine whether or not the decoloring is possible, based on the image read by the pre-decoloring reading unit 511. The decolorability determining unit 81 may determine whether or not the decoloring is possible based on both the thickness of the sheet and the image read by the pre-decoloring reading unit 511.

As a recording medium, any recording medium may be adopted as long as it can store a program and it is computer-readable. Specifically, as the recording medium, an internal storage device mounted inside a computer, for example, a ROM, a RAM, or the like, a portable storage medium such as a CD-ROM or flexible disk, a DVD disk, an optical magnetic disk, and an IC card, a database storing a computer program, or another computer and a database thereof or the like may be exemplified. Functions obtained from installing or downloading may be executed in cooperation with an OS inside the apparatus. A part or the entirety of the program may be a module that is dynamically generated and is executed.

The sequence of various processes in this embodiment may be different from that described as an example in the embodiment.

As described above, according to techniques described in this specification, it is possible to provide a decoloring technique a specific document.

While certain embodiments have been described, these embodiments have been presented by way of example only, and are not intended to limit the scope of invention. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A decoloring device comprising:

a decoloring unit that decolors an image formed with a decolorable coloring agent on a sheet;

a first sheet conveying unit that conveys the sheet to the decoloring unit;

a pre-decoloring reading unit that reads the image on the sheet conveyed by the first sheet conveying unit before the decoloring;

a type determining unit that determines a type of content on the sheet conveyed to the decoloring unit, based on the image read by the pre-decoloring reading unit;

a second sheet conveying unit that conveys the sheet from the decoloring unit;

a post-decoloring reading unit that reads a remaining image on the sheet conveyed by the second sheet conveying unit after the decoloring;

a determination criterion setting unit that sets at least one determination criterion for determining whether or not the decoloring by the decoloring unit is successful based on the determined type of content; and a decoloring success or failure determining unit that determines whether or not the decoloring of the image on the sheet by the decoloring unit is successful based on the remaining image read by the post-decoloring reading unit and based on the determination criterion set by the determination criterion setting unit.

2. The device according to claim 1, wherein the determination criterion set by the determination criterion setting unit is a density of the remaining image.

3. The device according to claim 1, wherein, if the type of the content on the sheet is determined to be a confidential type by the type determining unit, the determination criterion setting unit sets the determination criterion to a first determination criterion, and if the type of the content is determined not to be the confidential type by the type determination unit, the determination criterion setting unit sets the determination criterion to a second determination criterion having a threshold value below which the decoloring of the image is determined to be successful, that is higher than a corresponding threshold value of the first determination criterion.

4. The device according to claim 3, wherein the determination criterion set by the determination criterion setting unit includes a density of an image as the threshold value, and if the type of the content on the sheet conveyed to the decoloring unit is determined to be the confidential type by the type determining unit, the determination criterion setting unit sets the density to a first density, and if the type of the content is determined not to be the confidential type by the type determination unit, the determination criterion setting unit sets the density to a second density that is higher than the first density.

5. The device according to claim 3, wherein the determination criterion set by the determination criterion setting unit includes a dot size of an image as the threshold value, and if the type of the content on the sheet conveyed to the decoloring unit is determined to be the confidential type by the type determining unit, the determination criterion setting unit sets the dot size to a first dot size, and if the type of the content is determined not to be the confidential type by the type determination unit, the determination criterion setting unit sets the dot size to a second dot size that is larger than the first dot size.

6. The device according to claim 3, wherein if the type of the content on the sheet conveyed to the decoloring unit is determined to be the confidential type by the type determining unit, the determination criterion setting unit sets a sheet conveying speed of the second sheet conveying unit to a first speed, and if the type of the content is determined not to be the confidential type by the type determination unit, the determination criterion setting unit sets the sheet conveying speed to a second speed that is faster than the first speed.

7. The device according to claim 3, wherein if the type of the content on the sheet conveyed to the decoloring unit is determined to be the confidential type by the type determining unit, the determination criterion setting unit sets a resolution at which the post-decoloring reading unit reads the remaining image on the sheet to a first resolution, and if the type of the content is determined not to be the confidential type by the type determination unit, the determination criterion setting unit sets the resolution to a second resolution that is lower than the first resolution.

8. A method of determining a decoloring success or failure by a decoloring device including a decoloring unit that decolors an image formed with a decolorable coloring agent on a sheet, a first sheet conveying unit that conveys the sheet to the decoloring unit, a pre-decoloring reading unit that reads the image on the sheet conveyed by the first sheet conveying unit before the decoloring, a second sheet conveying unit that conveys the sheet from the decoloring unit, and a post-decoloring reading unit that reads a remaining image on the sheet conveyed by the second sheet conveying unit after the decoloring, the method comprising:

determining a type of content on the sheet conveyed to the decoloring unit, based on the image read by the pre-decoloring reading unit;

setting at least one determination criterion related to whether or not the decoloring is successful based on the determined type of content; and determining whether or not the decoloring of the image on the sheet by the decoloring unit is successful based on the remaining image read by the post-decoloring reading unit and based on the determination criterion.

9. The method according to claim 8, wherein the determination criterion is a density of the remaining image.

10. The method according to claim 8, wherein if the type of the content on the sheet is determined to be a confidential type, the determination criterion is set to a first determination criterion, and if the type of the content is determined not to be the confidential type, the determination criterion is set to a second determination criterion having a threshold value below which the decoloring of the image is determined to be successful, that is higher than a corresponding threshold value of the first determination criterion.

11. The method according to claim 10, wherein a density of an image is included as the threshold value, and if the type of the content on the sheet conveyed to the decoloring unit is determined to be the confidential type, the density as the threshold value is set to a first density, and if the type of the content is determined not to be the confidential type, the density is set to a second density that is higher than the first density.

12. The method according to claim 10, wherein a dot size of an image is included as the threshold value, and if the type of the content on the sheet conveyed to the decoloring unit is determined to be the confidential type, the dot size as the threshold value is set to a first dot size, and if the type of the content is determined not to be the confidential type, the dot size is set to the second dot size that is larger than the first dot size.

13. The method according to claim 10, further comprising:

if the type of the content on the sheet conveyed to the decoloring unit is determined to be the confidential type, setting a sheet conveying speed of the second sheet conveying unit to a first speed, and if the type of the content is determined not to be a predetermined highly the confidential type, setting the sheet conveying speed to a second speed that is faster than the first speed.

14. The method according to claim 10, further comprising:

if the type of the content on the sheet conveyed to the decoloring unit is determined to be the confidential type, setting a resolution at which the post-decoloring reading unit reads the remaining image on the sheet to a first resolution, and if the type of the content is determined not to be the confidential type, setting the resolution to a second resolution that is lower than the first resolution.

15. A non-transitory computer-readable recording medium recording a decoloring success or failure determining program that causes a computer to execute a decoloring success or failure determination in a decoloring device including a decoloring unit that decolors an image formed with a decolorable coloring agent on a sheet, a first sheet conveying unit that conveys the sheet to the decoloring unit, a pre-decoloring reading unit that reads the image on the sheet conveyed by the first sheet conveying unit before the decoloring, a second sheet conveying unit that conveys the sheet decolored by the decoloring unit, and a post-decoloring reading unit that reads a remaining image on the sheet conveyed by the second sheet conveying unit after the decoloring, the decoloring success or failure determining program causing the computer to execute:

determining a type of content on the sheet conveyed to the decoloring unit, based on the image read by the pre-decoloring reading unit;

setting at least one determination criterion related to the decoloring success or failure determination based on the determined type of content; and determining whether or not the decoloring by the decoloring unit is successful based on the remaining image read by the post-decoloring reading unit and based on the determination criterion.

16. The medium according to claim 15, wherein the determination criterion is a density of the remaining image.

17. The medium according to claim 15, wherein the decoloring success or failure determining program causes the computer to execute, if the type of the content on the sheet is determined to be a confidential type, setting the determination criterion to a first determination criterion, and if the type of the content is determined not to be the confidential type, setting the determination criterion to a second determination criterion having a threshold value below which the decoloring of the image is determined to be successful, that is higher than a corresponding threshold value of the first determination criterion.

18. The medium according to claim 17, wherein a density of an image is included as the threshold value, and the decoloring success or failure determining program causes the computer to execute, if the type of the content on the sheet conveyed to the decoloring unit is determined to be the confidential type, setting the density as the threshold value to a first density, and if the type of the content is determined not to be the confidential type, setting the density to a second density that is higher than the first density.

19. The medium according to claim 17, wherein a dot size of an image is included as the threshold value, and the decoloring success or failure determining program causes the computer to execute, if the type of the content on the sheet conveyed to the decoloring unit is determined to be the confidential type, setting the dot size as the threshold value to a first dot size, and if the type of the content is determined not to be the confidential type, setting the dot size to a second dot size that is larger than the first dot size.

20. The medium according to claim 17, wherein if the type of the content on the sheet conveyed to the decoloring unit is determined to be the confidential type, the decoloring success or failure determining program causes the computer to execute setting a sheet conveying speed of the second sheet conveying unit to a first speed, and if the type of the content is determined not to be the confidential type, setting the sheet conveying speed to a second speed that is faster than the first speed.

* * * * *